(12) United States Patent
Brown

(10) Patent No.: US 11,138,860 B2
(45) Date of Patent: Oct. 5, 2021

(54) REMOTE ENVIRONMENTAL CONDITION MONITORING AND REPORTING

(71) Applicant: Vapor Products Group, LLC, Troy, MI (US)

(72) Inventor: Craig D. Brown, Indianapolis, IN (US)

(73) Assignee: VAPOR PRODUCTS GROUP, LLC, Troy, MI (US)

( * ) Notice: Subject to any disclaimer, the term of this patent is extended or adjusted under 35 U.S.C. 154(b) by 0 days.

(21) Appl. No.: 16/682,705

(22) Filed: Nov. 13, 2019

(65) Prior Publication Data

US 2020/0152040 A1 May 14, 2020

Related U.S. Application Data

(63) Continuation of application No. 14/082,119, filed on Nov. 16, 2013, now Pat. No. 10,529,215.

(60) Provisional application No. 61/801,692, filed on Mar. 15, 2013, provisional application No. 61/727,393, filed on Nov. 16, 2012.

(51) Int. Cl.
| | |
|---|---|
| *G08B 21/12* | (2006.01) |
| *F24F 7/08* | (2006.01) |
| *F24F 7/06* | (2006.01) |
| *G08B 21/14* | (2006.01) |
| *F24F 7/10* | (2006.01) |

(52) U.S. Cl.
CPC .............. *G08B 21/12* (2013.01); *F24F 7/065* (2013.01); *F24F 7/08* (2013.01); *F24F 7/10* (2013.01); *G08B 21/14* (2013.01)

(58) Field of Classification Search
CPC ...... B08B 15/002; G08B 21/00; G08B 21/12; G08B 21/18; F24F 7/06; F24F 7/065; F24F 7/08; F24F 7/10; F24F 11/0001; F24F 11/0009; F24F 11/0015; F24F 11/0017; F24F 11/0041; F24F 11/006; F24F 7/001; F24F 7/002; F24C 15/2021; Y24F 7/00; Y24F 7/003; Y24F 7/007
See application file for complete search history.

(56) References Cited

U.S. PATENT DOCUMENTS 6,110,038 A * 8/2000 Stern .................... F24F 11/0001
454/343
6,753,186 B2 * 6/2004 Moskoff ................. C02F 1/008
210/94

(Continued)

*Primary Examiner* — Van T Trieu
(74) *Attorney, Agent, or Firm* — Stites & Harbison, PLLC; Terry L. Wright; James R. Hayne

(57) ABSTRACT

Various technologies for monitoring operation of an air contaminant mitigation system, such as a vapor intrusion and/or radon gas mitigation system, are disclosed. For example, in one embodiment, a monitoring system includes an air contaminant mitigation system to exhaust vapors from a contaminated area to a designated area and a sensor module coupled to the air contaminant mitigation system to generate sensor signals indicative of a sensor condition of the air contaminant mitigation system. The system may also include a sensor controller to receive the sensor signals from the sensor module and generate sensor data indicative of the sensor signals. Additionally, the system may include a data server to receive the sensor data from the sensor controller, store the sensor data in a local database, and transmit information based on the sensor data to a remote computing device.

18 Claims, 19 Drawing Sheets

(56) References Cited

U.S. PATENT DOCUMENTS

| | | | | |
|---|---|---|---|---|
| 8,939,825 B2* | 1/2015 | Hatton | ................... | F24F 11/74 |
| | | | | 454/237 |
| 2007/0131864 A1* | 6/2007 | Ellis | ................... | G01N 21/05 |
| | | | | 250/343 |
| 2009/0045925 A1* | 2/2009 | Demin | ................... | G05B 23/0291 |
| | | | | 340/12.32 |
| 2010/0291850 A1* | 11/2010 | Sabbaghian | ................... | B08B 15/002 |
| | | | | 454/61 |
| 2013/0295837 A1* | 11/2013 | Bailey | ................... | F24F 3/16 |
| | | | | 454/356 |
| 2014/0252099 A1* | 9/2014 | Hatton | ................... | F24F 7/06 |
| | | | | 236/44 A |

* cited by examiner

REMOTE ENVIRONMENTAL CONDITION MONITORING AND REPORTING

The present application is a continuation of U.S. patent application Ser. No. 14/082,119 entitled "REMOTE ENVIRONMENTAL CONDITION MONITORING AND REPORTING," which was filed on Nov. 16, 2013 and issued as U.S. Pat. No. 10,529,215 on Jan. 7, 2020, and which claims priority under 35 U.S.C. § 119(e) to U.S. Provisional Application Ser. No. 61/727,393, entitled "REMOTE ENVIRONMENTAL CONDITION MONITORING AND REPORTING," which was filed on Nov. 16, 2012, and to U.S. Provisional Application Ser. No. 61/801,692, entitled "REMOTE ENVIRONMENTAL CONDITION MONITORING AND REPORTING," which was filed on Mar. 15, 2013, the entirety of each of which is hereby incorporated by reference.

TECHNICAL FIELD

The present disclosure relates, generally, to environmental condition monitoring and reporting and, more particularly, to systems, methods, and devices for remotely monitoring, and generating reports of, the operation of vapor intrusion and/or radon mitigation systems installed at a location.

BACKGROUND

Adverse environmental conditions can render a location and/or building unsatisfactory for living or working. One type of adverse environmental conditions is air contaminants such as vapor intrusion or radon gas intrusion, which can occur when volatile chemicals contained in contaminated soil or groundwater emit vapors or other air contaminants. Such vapors and/or air contaminants can seep through the subsurface of a nearby or overlying building, entering the living or working space therein. The vapors and/or air contaminants emitted from the volatile chemicals can be harmful to the occupants of such buildings. Vapor intrusion may occur, for example, when land is repurposed from an original use, involving the use of such volatile chemicals (e.g., a gas station or chemical production plant), to another use (e.g., a business or residential building).

Federal and local regulations may require the rehabilitation of any location in which vapor intrusion has been detected to ensure a safe workplace or living space. Oftentimes, mitigation of vapor intrusion includes periodic, on-site sampling of the air quality of the workplace/living space. In some cases, the mitigation procedures may include remediation of the contamination source within the land itself. Alternatively, active mitigation systems may be used to mitigate the vapor intrusion. In many active mitigation systems, the contaminated area (e.g., the sub-slab ground) is depressurized relative to the living/working space. For example, a typical mitigation procedure may include the use of air conduits, which are sunk into the ground (e.g., through the subsurface of the building) and exhaust to the outside open air to lower the pressure of the contaminated area and facilitate propagation of any harmful vapors away from the workplace/living space. Such mitigation systems may include fans to depressurize the contaminated area and further facilitate the safe propagation of the harmful vapors. If so, proper fan operation may also be periodically checked as part of the periodic, on-site review.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

SUMMARY

Figure 1:
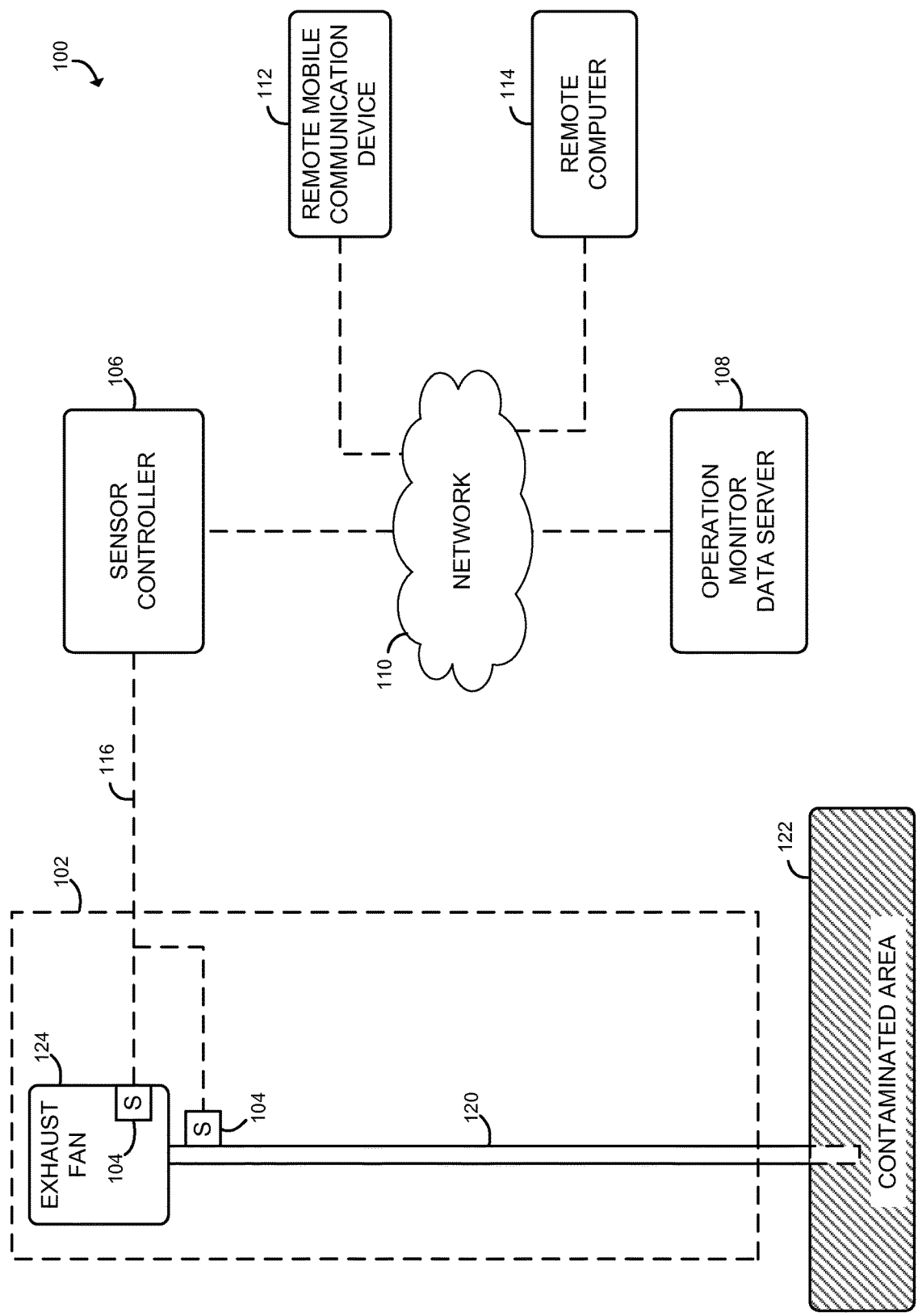
FIG. 1 is a simplified block diagram of at least one embodiment of a system for remotely monitoring operation of an air contaminant mitigation system of a rehabilitated location.

According to one aspect, a system for monitoring operation of air contaminant mitigation system may include an air contaminant mitigation system to exhaust vapors from a contaminated area to a designated area; a sensor module coupled to the air contaminant mitigation system to generate sensor signals indicative of a sensor condition of the air contaminant mitigation system; a sensor controller to receive the sensor signals from the sensor module and generate sensor data indicative of the sensor signals; and a data server to (i) receive the sensor data from the sensor controller, (ii) store the sensor data in a local database, and (iii) transmit information based on the sensor data to a remote computing device.

In some embodiments, the air contaminant mitigation system may be embodied as a vapor intrusion mitigation system and/or a radon gas mitigation system. Additionally, in some embodiments, the air contaminant mitigation system may include an exhaust fan coupled to an air conduit. In some embodiments, the sensor module may be connected to the exhaust fan of the air contaminant mitigation system. In some embodiments, the sensor module may include a sensor to detect operation of the exhaust fan. In some embodiments, the sensor may include a current sensor coupled to a power path of the exhaust fan to detect operation of the exhaust fan as a function of current supplied to the exhaust fan. In some embodiments, the sensor module is connected to the air conduit of the air contaminant mitigation system. In some embodiments, the sensor module may include a pressure sensor to measure an air pressure within the air conduit. In some embodiments, the sensor may include a gas sensor to detect the presence of a pre-determined type of gas within the air contained in the air conduit.

Additionally, in some embodiments, the sensor module may include at least one sensor to generate the sensor signals indicative of a sensor condition of the air contaminant mitigation system, and a communication circuit to transmit the sensor signals to the sensor controller. In some embodiments, the communication circuit may include a wireless communication circuit to wirelessly transmit the sensor signals to the sensor controller. In some embodiments, the communication circuit may include a wired communication circuit to transmit the sensor signals to the sensor controller over a wired communication link. In some embodiments, the communication circuit may include a modem configured to transmit the sensor signals over a telephone land line to the sensor controller. In some embodiments, the sensor module may include a local alarm circuit, wherein the local alarm circuit is to generate a local alarm in response to the sensor signals being outside a reference threshold.

Further, in some embodiments, the sensor controller may include a communication circuit to receive the sensor signals from the sensor module; and a control circuit to generate the sensor data as a function of the sensor signals and control the communication circuit to transmit the sensor data to the data server. In some embodiments, the communication circuit may include a first data communication circuit to receive the sensor signals from the sensor module. In some embodiments, the first communication circuit may include a wireless data communication circuit to receive the sensor signals from the sensor module via a wireless communication link. In some embodiments, the first communication circuit may include a wired data communication circuit to receive the sensor signals from the sensor module via a wired communication link. In some embodiments, the communication circuit may include a second data communication circuit to transmit the sensor data to the data server.

Additionally, in some embodiments, the second data communication circuit may include a cellular communication circuit to transmit the sensor data to the data server over a cellular network. In some embodiments, the sensor controller further includes a data storage, and the control circuit is to store the sensor signals in the data storage. In some embodiments, the control circuit is to generate the sensor data as a function of sensor signals received over a reference time period. In some embodiments, the sensor controller further includes a local alarm, and the control circuit is to activate the local alarm in response to the sensor data being outside a reference threshold. In some embodiments, the control circuit is to transmit, via the communication circuit, an alert to the data server in response to the sensor data being outside a reference threshold. In some embodiments, the sensor controller further includes a local alarm, and the control circuit is to activate the local alarm in response to an alarm condition detected by the control circuit.

In some embodiments, the control circuit is to transmit, via the communication circuit, an alert to the data server in response to detection of the alarm condition. In some embodiments, the communication circuit is to receive sensor signals from a plurality of sensor modules, and the control circuit is to generate the sensor data as a function of the sensor signals received from the plurality of sensor modules. In some embodiments, the sensor controller may include a battery backup, and the control circuit is configured to activate the battery backup in response to a loss of main power to the sensor controller.

Additionally, in some embodiments, the data server is to periodically transmit the information based on the sensor data to the remote computing device. In some embodiments, the data server is to transmit the information based on the sensor data to the remote computing device in response to a query received from the remote computing device. In some embodiments, the data server is to transmit the information to the remote computing device as a short message service (SMS) text message. In some embodiments, the data server is to transmit the information to the remote computing device over a network. In some embodiments, the data server is to transmit the information to a cellular phone over a cellular network. In some embodiments, the data server is to generate the information based on sensor data received over a referenced time period. In some embodiments, the data server is to generate a local alarm in response to the sensor data being outside a reference threshold. In some embodiments, the data server is to transmit an alert to the remote device in response to the sensor data being outside a reference threshold. In some embodiments, the data server is to monitor operation of the sensor controller and/or sensor module and store operation data indicative of the operation of the sensor controller and/or sensor module.

In some embodiments, the data server is to generate a local alarm in response to the operation data being outside a reference threshold. In some embodiments, the data server is to transmit an alert to the remote device in response to the operation data being outside a reference threshold. In some embodiments, the data server is to generate a report based on the operation data, wherein the report indicates at least an operation percentage indicative of the percentage of time during which the system was operational. In some embodiments, the data server is to generate a report based on the sensor data.

According to another aspect, a method for monitoring operation of an air contaminant mitigation system may include generating, on a sensor module, sensor signals indicative of a sensor condition of an air contaminant mitigation system; transmitting the sensor signals from the sensor module to a sensor controller; generating, on the sensor controller, sensor data indicative of the sensor signals; transmitting the sensor data from the sensor controller to a data server; generating information on the data server as a function of the sensor data; and facilitating access, by a remote computing device, to the information stored on the data server.

In some embodiments, generating sensor signals may include generating sensor signals indicative of a sensor condition of at least one of a vapor intrusion mitigation system and a radon gas mitigation system. In some embodiments, generating sensor signals may include generating sensor signals indicative of a current of an exhaust fan of the air contaminant mitigation system. In some embodiments, generating sensor signals may include generating sensor signals indicative of an air pressure within an air conduit the air contaminant mitigation system. In some embodiments, generating sensor signals may include generating sensor signals indicative of a type of gas present within air contained in an air conduit of the air contaminant mitigation system.

Additionally, in some embodiments, transmitting the sensor signals may include wirelessly transmitting the sensor signals from the sensor module to the sensor controller. In some embodiments, transmitting the sensor signals may include transmitting the sensor signals from the sensor module to the sensor controller over a wired communication link. In some embodiments, may include generating an alarm of the sensor module in response to the sensor signals being outside a reference threshold. In some embodiments, may include transmitting the sensor data comprises transmitting the sensor data from the sensor controller to the data server using a cellular network. In some embodiments, the method may include storing the sensor signals in a data storage of the sensor controller. In some embodiments, generating the sensor data may include generating the sensor data as a function of sensor signals received over a reference time period.

In some embodiments, the method may include generating a local alarm of the sensor controller in response to the sensor data being outside a reference threshold. In some embodiments, may include transmitting, from the sensor controller to the data server, an alert in response to the sensor data being outside a reference threshold. In some embodiments, the method may include generating sensor data may include generating sensor data indicative of sensor signals received from a plurality of sensor modules. In some embodiments, the method may include activating a battery backup of the sensor controller in response to detection of a loss of main power of the sensor controller. In some embodiments, facilitating access to the information may include transmitting the information from the data server to the remote computing device.

Further, in some embodiments, transmitting the information may include periodically transmitting the information based on the sensor data. In some embodiments, transmitting the information may include transmitting the information in response to a query received from the remote computing device. In some embodiments, transmitting the information may include transmitting the information to the remote computing device as a short message service (SMS) text message. In some embodiments, transmitting the information may include transmitting the information to the remote computing device over a network.

In some embodiments, facilitating access to the information may include transmitting the information to a cellular phone over a cellular network. In some embodiments, generating the information may include generating the information based on sensor data received over a referenced time period. In some embodiments, the method may include generating a local alarm on the data server in response to the sensor data being outside a reference threshold. In some embodiments, the method may include transmitting an alert to the remote computing device in response to the sensor data being outside a reference threshold. In some embodiments, monitoring, on the data server, operation of the sensor controller and/or sensor module, and storing operation data indicative of the operation of the sensor controller and/or sensor module on the data server. In some embodiments, the method may include generating a local alarm on the data server in response to the operation data being outside a reference threshold. In some embodiments, generating a report based on the operation data, wherein the report indicates at least an operation percentage indicative of the percentage of time during which the system was operational. In some embodiments, the method may include generating a report based on the sensor data.

According to another aspect, a sensor module for generating sensor signals indicative of a condition of an air contaminant mitigation system may include a sensor to generate sensor signals indicative of a sensor condition of the air contaminant mitigation system; and a communication circuit to transmit the sensor signals to a sensor controller. In some embodiments, the air contaminant mitigation system may include at least one of a vapor intrusion mitigation system and a radon gas mitigation system. In some embodiments, the sensor coupled to an exhaust fan of the air contaminant mitigation system to detect operation of the exhaust fan. In some embodiments, the sensor may include a current sensor to detection operation of the exhaust fan as a function of current supplied to the exhaust fan. In some embodiments, the sensor may include a pressure sensor to measure an air pressure within an air conduit of the air contaminant mitigation system. In some embodiments, the sensor may include a gas sensor to detect the presence of a pre-determined type of gas within the air contained in an air conduit of the air contaminant mitigation system. In some embodiments, the communication circuit may include a wireless communication circuit to transmit the sensor signals to the sensor controller over a wireless communication link. In some embodiments, the communication circuit may include a wired communication circuit to transmit the sensor signals to the sensor controller over a wired communication link. In some embodiments, a plurality of sensors to generate sensor signals indicative of multiple sensor conditions of the air contaminant mitigation system. In some embodiments, a local alarm circuit to generate a local alarm in response to the sensor signals being outside a reference threshold.

According to another aspect, a method for generating sensor signals indicative of a condition of an air contaminant mitigation system may include generating sensor signals indicative of a sensor condition of the air contaminant mitigation system; and transmitting the sensor signals to a sensor controller. In some embodiments, generating sensor signals may include generating sensor signals indicative of a sensor condition of at least one of a vapor intrusion mitigation system and a radon gas mitigation system. In some embodiments, generating sensor signals may include generating sensor signals indicative of a current of an exhaust fan of the air contaminant mitigation system. In some embodiments, generating sensor signals may include generating sensor signals indicative of an air pressure within an air conduit the air contaminant mitigation system. In some embodiments, generating sensor signals may include generating sensor signals indicative of a type of gas present within air contained in an air conduit the air contaminant mitigation system. In some embodiments, transmitting the sensor signals may include wirelessly transmitting the sensor signals to the sensor controller over a wireless communication link. In some embodiments, transmitting the sensor signals may include transmitting the sensor signals to the sensor controller over a wired communication link. In some embodiments, the method may include generating an alarm of the sensor module in response to the sensor signals being outside a reference threshold.

According to another aspect, a sensor controller for generating sensor data indicative of a condition of an air contaminant mitigation system may include a communication circuit to receive sensor signals from a plurality of sensor modules coupled to the air contaminant mitigation system, the sensor signals being indicative of a sensor condition of the air contaminant mitigation system; and a control circuit to generate sensor data as a function of the sensor signals and control the communication circuit to transmit the sensor data to the data server. In some embodiments, the air contaminant mitigation system may include at least one of a vapor intrusion mitigation system and a radon gas mitigation system. In some embodiments, the communication circuit may include a first data communication circuit to receive the sensor signals from the plurality of sensor modules and a second data communication circuit to transmit the sensor data to the data server. In some embodiments, the first communication circuit may include a wireless data communication circuit to wirelessly receive the sensor signals from the plurality of sensor modules over a wireless communication link. In some embodiments, the first communication circuit may include a wired data communication circuit to receive the sensor signals from the plurality of sensor modules over a wired communication link. In some embodiments, the second communication circuit may include a cellular communication circuit to transmit the sensor data to the data server over a cellular network.

Additionally, in some embodiments, the sensor controller may include a data storage, and the control circuit is to store the sensor signals in the data storage. In some embodiments, the control circuit is to generate the sensor data as a function of sensor signals received over a reference time period. In some embodiments, a local alarm, and the control circuit is to activate the local alarm in response to the sensor data being outside a reference threshold. In some embodiments, the control circuit is to transmit, via the communication circuit, an alert to the data server in response to the sensor data being outside a reference threshold. In some embodiments, a local alarm, and the control circuit is to activate the local alarm in response to an alarm condition detected by the control circuit. In some embodiments, the control circuit is to transmit, via the communication circuit, an alert to the data server in response to detection of the alarm condition. In some embodiments, a battery backup, and the control circuit is configured to activate the battery backup in response to a loss of main power to the sensor controller.

According to another aspect, a method for generating sensor data indicative of a condition of an air contaminant mitigation system may include receiving sensor signals from a plurality of sensor modules coupled to the air contaminant mitigation system, the sensor signals being indicative of a sensor condition of the air contaminant mitigation system; generating sensor data as a function of the sensor signals; and transmitting the sensor data to a data server. In some embodiments, receiving sensor signals may include receiving sensor signals from a plurality of sensor modules coupled to at least one of a vapor intrusion mitigation system and a radon gas mitigation system. In some embodiments, transmitting the sensor data may include transmitting the sensor data from the sensor controller to the data server using a cellular network. In some embodiments, the method may include storing the sensor signals in a data storage of the sensor controller. In some embodiments, generating the sensor data may include generating the sensor data as a function of sensor signals received over a reference time period. In some embodiments, the method may include activating a local alarm of the sensor controller in response to the sensor data being outside a reference threshold. In some embodiments, the method may include transmitting, from the sensor controller to the data server, an alert in response to the sensor data being outside a reference threshold. In some embodiments, the method may include activating a battery backup of the sensor controller in response to detection of a loss of main power of the sensor controller.

According to another aspect, a data server for monitoring operation of an air contaminant mitigation system may include a communication circuit; a processor; and a memory having stored therein a plurality of instructions that, in response to being executed by the processor, cause the data server to receive sensor data from a sensor controller using the communication circuit, the sensor data being indicative of a sensor condition of the air contaminant mitigation system; generate information as a function of the sensor data; and facilitate access to the information by a remote computing device.

In some embodiments, the air contaminant mitigation system may include at least one of a vapor intrusion mitigation system and a radon gas mitigation system. In some embodiments, facilitate access to the information may include to transmit the information to the remote computing device. In some embodiments, to transmit the information may include to periodically transmit the information based on the sensor data. In some embodiments, to transmit the information may include to transmit the information in response to a query received from the remote computing device. In some embodiments, to transmit the information may include to transmit the information to the remote computing device as a short message service (SMS) text message. In some embodiments, to transmit the information may include to transmit the information to the remote computing device over a network.

Additionally, in some embodiments, to facilitate access to the information may include to transmit the information to a cellular phone over a cellular network. In some embodiments, to generate the information may include to generate the information based on sensor data received over a referenced time period. In some embodiments, the plurality of instructions, when executed by the processor, further cause the data server to generate a local alarm on the data server in response to the sensor data being outside a reference threshold. In some embodiments, the plurality of instructions, when executed by the processor, further cause the data server to transmit an alert to the remote computing device in response to the sensor data being outside a reference threshold. In some embodiments, the plurality of instructions, when executed by the processor, further cause the data server to monitor operation of the sensor controller, and store operation data indicative of the operation of the sensor controller on the data server. In some embodiments, plurality of instructions, when executed by the processor, further cause the data server to activate a local alarm of the data server in response to the operation data being outside a reference threshold. In some embodiments, the plurality of instructions, when executed by the processor, further cause the data server to generate a report based on the operation data, wherein the report indicates at least an operation percentage indicative of the percentage of time during which the system was operational. In some embodiments, the plurality of instructions, when executed by the processor, further cause the data server to generate a report based on the sensor data.

According to another aspect, a method for monitoring operation of an air contaminant mitigation system may include receiving, on an data server, sensor data from a sensor controller, the sensor data being indicative of a sensor condition of the air contaminant mitigation system; generating, on the data server, information as a function of the sensor data; and facilitating, on the data server, access to the information by a remote computing device.

In some embodiments, receiving sensor data may include receiving sensor data indicative of a sensor condition of at least one of a vapor intrusion mitigation system and a radon gas mitigation system. In some embodiments, facilitating access to the information may include transmitting the information from the data server to the remote computing device. In some embodiments, transmitting the information may include periodically transmitting the information based on the sensor data. In some embodiments, transmitting the information may include transmitting the information in response to a query received from the remote computing device. In some embodiments, transmitting the information may include transmitting the information to the remote computing device as a short message service (SMS) text message. In some embodiments, transmitting the information may include transmitting the information to the remote computing device over a network.

Additionally, in some embodiments, the method may include facilitating access to the information may include transmitting the information to a cellular phone over a cellular network. In some embodiments, generating the information may include generating the information based on sensor data received over a referenced time period. In some embodiments, the method may include generating a local alarm on the data server in response to the sensor data being outside a reference threshold. In some embodiments, the method may include transmitting an alert to the remote computing device in response to the sensor data being outside a reference threshold. In some embodiments, the method may include monitoring, on the data server, operation of the sensor controller, and storing operation data indicative of the operation of the sensor controller on the data server. In some embodiments, the method may include generating a local alarm on the data server in response to the operation data being outside a reference threshold. In some embodiments, the method may include generating a report based on the operation data, wherein the report indicates at least an operation percentage indicative of the percentage of time during which the system was operational. In some embodiments, the method may include generating a report based on the sensor data.

According to another aspect, a system for monitoring operation of air contaminant mitigation system may include an air contaminant mitigation system, a first sensor module coupled to the air contaminant mitigation system, and a second sensor module coupled to the air contaminant mitigation system. The system may further include a first sensor controller, a second sensor controller, and a data server. In some embodiments, the air contaminant mitigation system may be configured to exhaust vapors from a contaminated area to a designated area. Additionally, in such embodiments, the first sensor module be configured to generate sensor signals indicative of a first sensor condition of the air contaminant mitigation system, and the second sensor module may be configured to generate sensor signals indicative of a second sensor condition of the air contaminant mitigation system. In some embodiments, the first sensor controller may be configured receive the sensor signals from the first sensor module and generate sensor data indicative of the sensor signals. Additionally, in some embodiments, the second sensor controller may be configured to receive the sensor signals from the second sensor module and generate sensor data indicative of the sensor signals. In some embodiments, the data server may be configured to receive the sensor data from the first and second sensor controllers, store the sensor data in a local database, and transmit information based on the sensor data to a remote computing device.

Additionally, in some embodiments, the first sensor controller may include a first programmable logic controller, and the second sensor controller may include a second programmable logic controller. In some embodiments, to receive the sensor signals from the first sensor module and generate sensor data indicative of the sensor signals may include to execute ladder logic for receiving the sensor signals from the first sensor module and generating sensor data indicative of the sensor signals. Additionally, to receive the sensor signals from the second sensor module and generate sensor data indicative of the sensor signals may include to execute ladder logic for receiving the sensor signals from the second sensor module and generating sensor data indicative of the sensor signals.

In some embodiments, to generate sensor signals indicative of a first sensor condition of the air contaminant mitigation system may include to measure an amount of pressure in an air conduit. Additionally, to measure an amount of pressure in an air conduit may include to sense a differential pressure of a vacuum source of the conduit relative to an indoor air pressure. In some embodiments, to measure an amount of pressure in an air conduit may include to measure an amount of pressure in an air conduit between about zero inches of water column to about five inches of water column. Additionally, to measure an amount of pressure in an air conduit between about zero inches of water column to about five inches of water column may include to measure an amount of pressure in an air conduit between about zero inches of water column to about five inches of water column with an accuracy of about plus or minus two percent. Additionally, in some embodiments, to measure an amount of pressure in an air conduit may include to measure an amount of pressure in an air conduit between about zero inches of water column to about twenty inches of water column. In some embodiments, to measure an amount of pressure in an air conduit between about zero inches of water column to about twenty inches of water column may include to measure an amount of pressure in an air conduit between about zero inches of water column to about twenty inches of water column with an accuracy of about plus or minus two percent.

Additionally, in some embodiments, to generate sensor signals indicative of a first sensor condition of the air contaminant mitigation system may include to generate sensor signals indicative of an amount of pressure in an air conduit. In some embodiments, to generate sensor signals indicative of an amount of pressure in an air conduit may include to generate analog sensor signals indicative of an amount of pressure in an air conduit. Additionally, in some embodiments, to receive the sensor signals from the first sensor module may include to receive, from the first sensor module, the analog sensor signals indicative of the amount of pressure in an air conduit. Further, in some embodiments, the first sensor controller further to convert the received analog sensor signals indicative of the amount of pressure in an air conduit into engineering units. Additionally, in some embodiments, to convert the received analog sensor signals indicative of the amount of pressure in an air conduit into engineering units may include to convert the received analog sensor signals indicative of the amount of pressure in an air conduit into inches of water column.

Additionally, in some embodiments, the first sensor controller to generate an alarm condition in response to detecting an incoming loss of power. Further, in some embodiments, the first sensor controller includes a battery backup.

In some embodiments, the battery backup to provide power to the first sensor controller in response to detecting an incoming loss of power. Additionally, in some embodiments, the battery backup may include a trickle charger. In some embodiments, the trickle charger to recharge one or more batteries of the battery backup in response to at least one of a partial or a complete depletion of battery charge from the incoming loss of power.

In some embodiments, the first sensor controller further to enable at least one of a remote computer or a remote mobile communication device to remotely administer one or more settings of the first sensor controller. Additionally, in some embodiments to remotely administer one or more settings of the first sensor controller may include to at least one of modify or configure a reference alarm threshold.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices may be set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the disclosed technologies may be implemented in hardware, firmware, software, or any combination thereof. Embodiments of the disclosed technologies implemented in a computer system may include one or more bus-based interconnects between components and/or one or more point-to-point interconnects between components. Embodiments of the disclosed technologies may also be implemented as instructions carried by or stored on a transitory or non-transitory machine-readable storage medium, which may be read and executed by one or more processors. A machine-readable storage medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, ladder logic, and/or other programming languages.

Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. Also, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Herein, alphanumeric characters and/or mathematical symbols, or a combination thereof, may be used to represent data values, variables, coefficients, functions, equations or portions thereof. It should be understood that once defined, a character or symbol may be repeated throughout the disclosure, and that, unless otherwise stated, such repeated instances of a character or symbol refer to the same character or symbol as initially defined.

Referring now to FIG. 1, in one embodiment a system 100 for monitoring operation of an air contaminant mitigation system 102 includes a sensor module 104, a sensor controller 106, and an operation monitor data server 108. The air contaminant mitigation system 102 may be embodied as any type of air contaminant mitigation system capable of being monitored by the system 100. For example, the mitigation system 102 may embodied as a vapor intrusion mitigation system, a radon gas mitigation system, or other air contaminant mitigation system. As such, although the air contaminant mitigation system 102 is described below, in some sections, as a vapor mitigation system, it should be appreciated that the air contaminant mitigation system 102 may be used with other types of mitigation systems including, but not limited to, radon mitigation systems.

The air contaminant mitigation system 102 may be installed at a location, such as a business or residential building, to mitigate the intrusion of harmful vapors and/or other air contaminants (e.g., radon gas) into the workplace or living space from contaminated soil or groundwater located under or near the location. In the illustrative embodiment, air contaminant mitigation system 102 includes an air conduit 120, which is sunk into the contaminated area 122 (e.g., into the contaminated soil or ground water). In some embodiments, the air conduit 120 may be located within the building to be rehabilitated. In such embodiments, the air conduit 120 may extend through the foundation of the rehabilitated building to reach the contaminated area 122. The air contaminant mitigation system 102 also includes an exhaust fan 124 pneumatically coupled to the air conduit 120 to exhaust harmful vapors generated by the contaminated area 122 to a location outside the rehabilitated building.

The sensor module 104 is coupled to the air contaminant mitigation system 102 and configured to monitor or detect sensor conditions of the system 102. Such sensor conditions may include any condition of the air contaminant mitigation system 102 detectable by a corresponding suitable sensor. For example, such sensor conditions may include operational parameters of the exhaust fan 124 (e.g., whether the exhaust fan is working), operational parameters of the air conduit 120 (e.g., whether a proper pressure is maintained in the air conduit 120 by the corresponding exhaust fan 124), and/or parameters of the air contained in an air conduit 120 (e.g., the type of gas(es) present in the air contained within the air conduit 120).

The sensor module 104 generates sensor signals indicative of the sensor conditions of the system 102 and transmits the sensor signals, or sensor data indicative thereof, to the sensor controller 106 over a communication link 116. The communication link 116 may be embodied as a wired or wireless communication link as discussed in more detail below.

Figure 2:
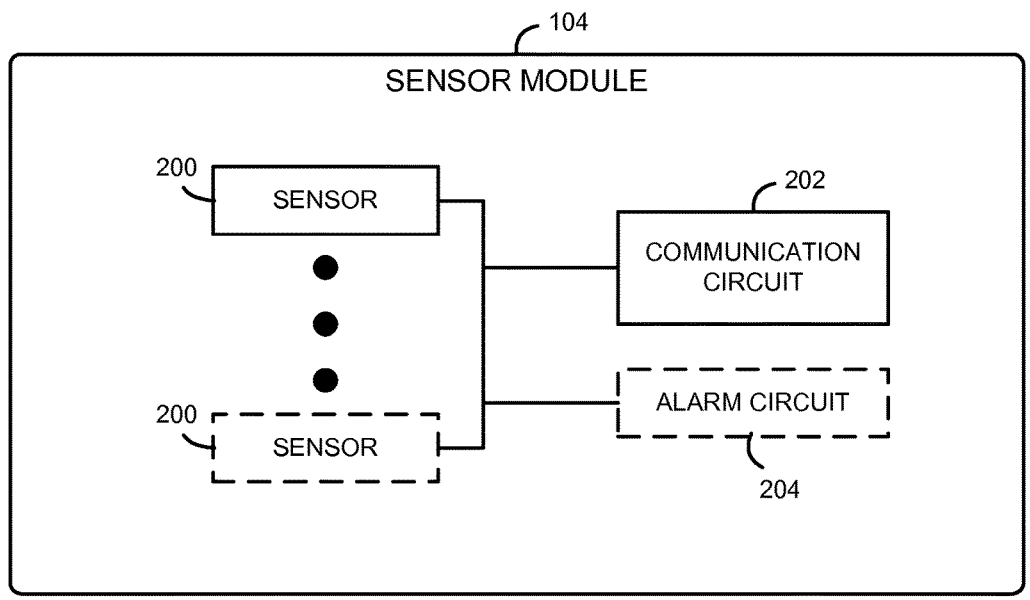
FIG. 2 is a simplified block diagram of at least one embodiment of a sensor module of the system of FIG. 1.

Referring now to FIG. 2, in one embodiment, the sensor module 104 includes one of more sensors 200 and a communication circuit 202. The sensor(s) 200 may be embodied as any type of sensor to detect or otherwise monitor a sensor condition of the air contaminant mitigation system 102. For example, in embodiments in which the sensor module 104 is coupled to an exhaust fan 124, the sensor(s) 200 may be embodied as a current sensor coupled to a power path, cable, or connection of the exhaust fan 124 to detect the amount of current used by the exhaust fan 124 to thereby infer whether the exhaust fan 124 is operational (e.g., whether the exhaust fan 124 is on/off). Alternatively, in such embodiments, the sensor(s) 200 may be embodied as an optical sensor, airflow sensor, camera, or other sensor capable of detecting the operational state of the corresponding exhaust fan 124. In embodiments in which the sensor module 104 is coupled to an air conduit 120, the sensor(s) 200 may be embodied as any type of sensor capable detecting or otherwise monitoring a parameter of the air conduit 120. For example, in some embodiments, the sensor(s) 200 may be embodied as a pressure sensor to monitor the air pressure within the air conduit 120 to infer whether a proper pressure is being maintained therein by the corresponding exhaust fan 124. To do so, the sensor(s) 200 may measure the differential pressure of a vacuum source (e.g., a fan, a pump, or any other vacuum source) compared to the indoor air pressure. In some embodiments, the sensor(s) 200 may be configured to measure pressure within a range from about zero inches of water column to about five inches of water column with an accuracy of about plus or minus two percent. In other embodiments, the sensor(s) 200 may be configured to measure pressure within a range from about zero inches of water column to about twenty inches of water column with an accuracy of about plus or minus two percent. In other embodiments, the sensor(s) 200 may be embodied as a gas sensor to detect the presence and/or magnitude of a particular type of gas present in the air conduit 120. Of course, in some embodiments, the sensor module 104 may include a plurality of sensors 200, each of a different type (e.g., a current sensor, a pressure sensor, and a gas sensor).

As discussed above, the sensor(s) 200 generate sensor signals indicative of the corresponding monitored sensor condition of the air contaminant mitigation system 102, which are provided to the communication circuit 202. For example, in embodiments in which the sensor(s) 200 sense pressure, the sensor(s) 200 may encode the sensed pressures into an analog format (e.g., 4-20 mA DC, 0-5 VDC, 0-10 VDC, etc.). Subsequently, the sensed pressures encoded in analog format are provided to the communication circuit 202. The communication circuit 202 subsequently transmits the sensor signals to the sensor controller 106 over the communication link 116. In the illustrative embodiment, the communication circuit 202 is embodied as a wireless communication circuit configured to wirelessly transmit the sensor signals over the wireless communication link 116. In such embodiments, the communication circuit 202 may use any suitable communication protocol to wirelessly transmit the sensor signals to the sensor controller 106 including, for example, ZigBee®, Wi-Fi™, Z-Wave™, Bluetooth®, infrared, and/or other wireless communication protocols or technologies (e.g., non-licensed communications, spread spectrum, frequency hopping, frequency-hopping spread spectrum, and/or the like). Alternatively, in embodiments in which the communication link 116 is embodied as a wired communication link, the communication circuit 202 may be embodied as a wired communication circuit configured to transmit the sensor signals over the wired communication link 116. In such embodiments, the communication circuit 202 may use any suitable wired communication protocol to transmit the sensor signals to the sensor controller 106 including, for example, Ethernet. Additionally, in some embodiments, the communication circuit 202 may transmit the sensor signals in-real time, near real time, periodically, or in response to a query from the sensor controller 106.

In some embodiments, the sensor module 104 may also include an alarm circuit 204. In such embodiments, the alarm circuit 204 is configured to monitor the sensor signals generated by the sensor(s) 200 and activate a local alarm in response to the generated sensor signals being outside a reference threshold (e.g., the current drawn by an exhaust fan being less than a reference current threshold, the pressure established in the air conduit 120 being less than a reference pressure threshold, etc.). Such local alarm may include, for example, an audible (e.g., a buzzer) or visual (e.g., a blinking light) alarm. In some embodiments, the sensor module 104 may be configured to transmit an alert to the sensor controller 106 in the event of such an alarm.

Referring now back to FIG. 1, the sensor controller 106 receives sensor signals from the sensor module 104. As discussed above, the sensor module 104 may transmit the sensor signals to the sensor controller 106 via wireless or wired communication. The sensor controller 106 generates sensor data based on the received sensor signals and transmits the sensor data to the operation monitor data server 108 over a network 110. The sensor controller 106 may be embodied as any type of controller or control circuit including, for example, a process automation computer, a programmable logic controller, a computer, a laptop computer, a server, and/or other computing device. The network 110 may be embodied as any type of data network capable of facilitating communications between the sensor controller 106 and the operation monitor data server 108. In the illustrative embodiment, the network 110 is embodied as, or otherwise includes, a cellular data network (e.g., a GSM cellular data network, a CDMA cellular data network, an LTE cellular data network, and/or the like) over which the sensor controller 106 transmits the sensor data to the operation monitor data server 108. Of course, in other embodiments, the network 110 may be embodied as other types of networks capable of facilitating communication between the sensor controller 106 and the operation monitor data server 108 depending, for example, on the location of the operation monitor data server 108 relative to the sensor controller 106.

Figure 3:
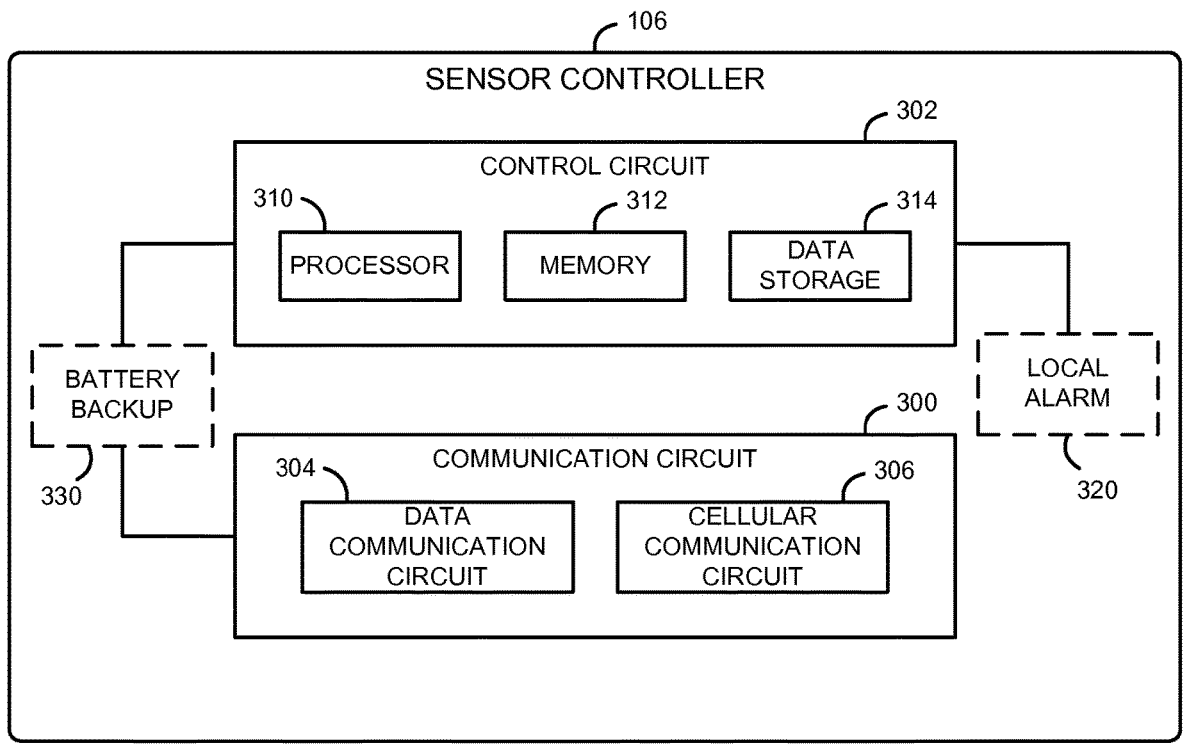
FIG. 3 is a simplified block diagram of at least one embodiment of a sensor controller of the system of FIG. 1.

Referring now to FIG. 3, in the illustrative embodiment, the sensor controller 106 includes a communication circuit 300 and a control circuit 302. The communication circuit 300 may be embodied as any type of communication circuit capable of communicating with the sensor module 104 and the operation monitor data server 108. For example, in the illustrative embodiment of FIG. 3, the communication circuit 300 includes a data communication circuit 304 to receive the sensor signals transmitted by the sensor module 104. The data communication circuit 304 may be embodied as a wireless or wired data communication link depending on, for example, the type of communication link 116 used to communicate data between the sensor module 104 and the sensor controller 106. For example, in embodiments in which the communication link 116 is embodied as a wireless communication link, the data communication circuit 304 may be embodied as a wireless data communication circuit and may use any suitable wireless communication protocol to communicate with the sensor module 104 including, for example, ZigBee®, Wi-Fi™, Z-Wave®, Bluetooth®, infrared, and/or other wireless communication protocols or technologies (e.g., non-licensed communications, spread spectrum, frequency hopping, frequency-hopping spread spectrum, and/or the like). Alternatively, in embodiments in which the communication link is embodied as a wired communication link, the data communication circuit 304 may be embodied as a wired data communication circuit and may use any suitable wired communication protocol to communicate with the sensor module 104 including, for example, Ethernet, and/or other wired communication protocols. Although illustratively shown as being separate from the control circuit 302, the data communication circuit 304 may form a portion of, or be integrated with, the control circuit 302 in some embodiments.

The communication circuit 300 also illustratively includes a cellular communication circuit 306 to communicate the sensor data to the operation monitor data server 108 over the network 110. To do so, the cellular communication circuit 306 may utilize any suitable cellular data communications protocol (e.g., a GSM cellular communications, CDMA cellular communications, LTE cellular communications, and/or other types of cellular communications). In such embodiments, the cellular communication circuit 306 may also be configured to enable the sensor controller 106 to be polled via the network 110 using cellular communication protocols. Of course, in other embodiments, the communication circuit 300 may include other or additional communication circuits to facilitate communication between the sensor controller 106 and the sensor module 104 and/or operation monitor data server 108. Again, although illustratively shown as being separate from the control circuit 302, the cellular communication circuit 306 may form a portion of, or be integrated with, the control circuit 302 in some embodiments.

The control circuit 302 of the sensor controller 106 is configured to receive the sensor signals from the communication circuit 300 and generate sensor data based on the sensor signals. The sensor data may be embodied as the sensor signals themselves or as data generated as a function of the sensor signals. For example, in some embodiments, the generated sensor data may be embodied as samples of the sensor signals, as averages of the sensor signals over referenced time periods, or other data representative of or otherwise indicative of the sensor signals. Additionally, in some embodiments, the sensor data may be an aggregation of sensor signals from multiple sensor modules 104 as discussed in more detail below. In some embodiments, the control circuit 302 may receive a pressure sensed by one of the sensors 200 in an analog format (e.g., 4-20 mA DC, 0-5 VDC, 0-10 VDC, etc.). In such embodiments, the control circuit 302 may be configured to convert the pressure in the analog format to a different format for display. For example, in some embodiments, the control circuit 302 may be configured to convert analog pressure signals into engineering units (e.g., inches of water column, etc.). In some embodiments, the control circuit 302 may also be configured to facilitate the remote administration of the sensor controller 106. For example, the control circuit 302 may enable the remote administration (e.g., adjust pressure inside of the conduit 120, adjust the speed of the exhaust fan 124, turn on/off the exhaust fan/vacuum source 124, adjust differentials and set points, adjust or set reference alarm thresholds, change the operational state of the exhaust fan 124, and/or remotely manage any other setting, configuration, or operating condition of a component of the system 100).

The control circuit 302 may be embodied as any type of control circuit capable of performing the functions described herein including, but not limited to, a programmable logic controller. In the illustrative embodiment, the control circuit 302 includes a processor 310, a memory 312, and a data storage 314. Of course, the control circuit 302 may include additional or other components, such as those commonly found in a control circuit or computer. The processor 310 may be embodied as any type of processor capable of performing the functions described herein. For example, in some embodiments, the processor 310 may be embodied as or otherwise include a special-purpose processor or microcontroller or a general-purpose processor capable of executing software/firmware. In such embodiments, the processor 310 may be embodied as a single core processor or a multi-core processor having multiple processor cores in other embodiments.

The memory 312 of the sensor controller 106 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. Although only a single memory 312 is illustrated in FIG. 3, the sensor controller 106 may include additional memory devices in other embodiments. Various data and software may be stored in the memory 312 including, for example, one or more operating systems, applications, programs, libraries, and/or drivers.

The data storage 314 may be embodied as any type of device or devices configured for the short-term or long-term storage of data such as, for example, memory devices and circuits, memory cards, hard disk drives, solid-state drives, or other data storage devices. In use, the control circuit 302 may store the received sensor signals and/or the generated sensor data, as well as other operational data, in the data storage 314.

In some embodiments, the sensor controller 106 may also include a local alarm 320. The local alarm 320 may be embodied as an audible, visual, or tactile alarm. In such embodiments, the control circuit 302 may be configured to activate the local alarm 320 in response to one or more alarm conditions. Such alarm conditions may be based on the received sensor signals, the generated sensor data, and/or communications (or lack thereof) from the sensor modules 104. For example, in some embodiments, the sensor controller 106 may activate the local alarm 320 in response to the received sensor signals or generated data being outside a referenced threshold (e.g., the sensor signals indicative of the air pressure within an air conduit is below a reference threshold, the generated sensor data is below an average threshold, etc.). Additionally or alternatively, the control circuit 302 may activate the local alarm 320 in response to an alert received from one of the sensor modules 104. Further, the control circuit 302 may activate the local alarm 320 if an expected communication is not received from a sensor module 104. For example, in some embodiments, the sensor modules 104 may be configured to periodically send the sensor signals to the sensor controller 106. If the sensor controller 106 does not receive such communication at the expected time, the sensor controller 106 may infer that the sensor module 104 is inoperable. In other embodiments, the sensor modules 104 may transmit a "heartbeat" signal to the sensor controller 106, which may determine whether the sensor module 104 is operable or inoperable based on receipt of such "heartbeat" signals. In some embodiments, the control circuit 302 may activate a local alarm in response to sensing an in incoming power loss. For example, the sensor controller 106 may be configured to detect the loss of incoming A/C mains power (or D/C power if operating on battery power or another power source).

Additionally, in some embodiments, the sensor controller 106 may include a battery backup 330. In such embodiments, the battery backup 330 may supply power to the sensor controller 106 in the event that a main power supply to the sensor controller 106 is lost. In some embodiments, the battery backup 330 may supply power only to predefined circuits of the sensor controller 106. For example, in some embodiments, the battery backup 330 may supply power to control circuit 302 to allow activation of the local alarm 320 and/or to the communication circuit 300 to allow the transmission of an alert to the operation monitor data server 108. The battery backup 330 may also be configured to supply power to a portion or all of the components of the sensor controller 106 for a reference amount of time. For example, the battery backup 330 may be configured to supply power to all of the components (or a portion thereof) for five minutes (or any other amount of time). To do so, the battery backup 330 may include or may otherwise be coupled to one or more batteries, which may be configured to supply power to all or a portion of the components of the sensor controller 106 for the reference amount of time. Additionally, in some embodiments, the sensor controller 106 (and/or the battery backup 330 itself) may include a trickle battery charger to recharge (if mains power exists) one or more batteries (e.g., one or more gelled electrolyte batteries and/or any other type of battery) of the battery backup 330 in response to partial or complete charge depletion resulting from a power loss event.

Referring back to FIG. 1, the operation monitor data server 108 receives the sensor data from the sensor controller 106 over the network 110. The operation monitor data server 108 is configured to record and store the sensor data and facilitate access to the sensor data by one or more remote devices, such as a remote mobile communication device 112 and/or a remote computer 114. Additionally, in some embodiments, the operation monitor data server 108 generates operational data (e.g., the length of "in-operation-time" of the air contaminant mitigation system 102) based on the sensor data and/or other data. The operation monitor data server 108 may generate reports based on the sensor data and/or operation data. Such reports may be required by various local and federal agencies to validate proper vapor intrusion mitigation of the rehabilitated location. Although shown in FIG. 1 as monitoring a single air contaminant mitigation system 102, the operation monitor data server 108 may monitor multiple air contaminant mitigation systems 102 located at the same or different monitored sites (e.g., located in different buildings).

The operation monitor data server 108 may facilitate access to the sensor and/or operation data by transmitting such data to the remote mobile communication device 112 and/or the remote computer 114 over the network 110 and/or providing a web portal from which such data may be accessed (see, e.g., FIGS. 10-14). The remote mobile communication device 112 may be embodied as any type of mobile communication device such as a smart phone, personal digital assistant (PDA), laptop computer, mobile internet device (MID), or other mobile communication device. Similarly, the remote computer 114 may be embodied as any type of computer such as a desktop computer, a laptop computer, a server, a smart appliance, and/or other computing device. As discussed in more detail below, the operation monitor data server 108 may transmit the sensor and/or operation data to the remote mobile communication device 112 and/or the remote computer 114 as an c-mail, voice-mail, text message, or other message capable of being transmitted over the network 110.

Figure 4:
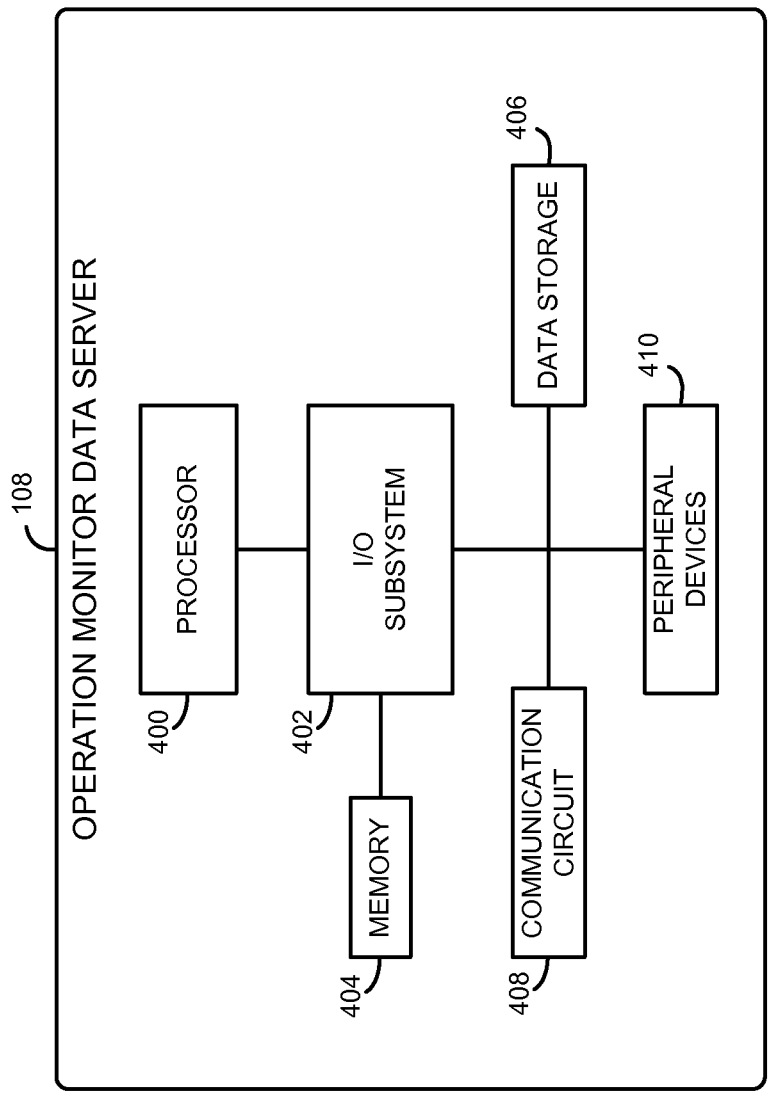
FIG. 4 is a simplified block diagram of at least one embodiment of an operation monitor data server of the system of FIG. 1.

As shown in FIG. 4, the illustrative operation monitor data server 108 includes a processor 400, an I/O subsystem 402, a memory 404, a data storage 406, a communication circuitry 408, and one or more peripheral devices 410. In some embodiments, several of the foregoing components may be incorporated on a motherboard or main board of the operation monitor data server 108, while other components may be communicatively coupled to the motherboard via, for example, a peripheral port. Furthermore, it should be appreciated that the operation monitor data server 108 may include other components, sub-components, and devices commonly found in a computer and/or server, which are not illustrated in FIG. 4 for clarity of the description.

The processor 400 of the operation monitor data server 108 may be embodied as any type of processor capable of executing software/firmware, such as a microprocessor, digital signal processor, microcontroller, or the like. The processor 400 is illustratively embodied as a single core processor. However, in other embodiments, the processor 400 may be embodied as a multi-core processor having multiple processor cores. Additionally, the operation monitor data server 108 may include additional processors 400 having one or more processor cores in other embodiments.

The I/O subsystem 402 of the operation monitor data server 108 may be embodied as circuitry and/or components to facilitate input/output operations with the processor 400 and/or other components of the operation monitor data server 108. In some embodiments, the I/O subsystem 402 may be embodied as a memory controller hub (MCH or "northbridge"), an input/output controller hub (ICH or "southbridge"), and a firmware device. In other embodiments, the I/O subsystem 402 may be embodied as a platform controller hub (PCH). In such embodiments, the memory controller hub (MCH) may be incorporated in or otherwise associated with the processor 400, and the processor 400 may communicate directly with the memory 404.

The processor 400 is communicatively coupled to the I/O subsystem 402 via a number of signal paths. Those signal paths (and other signal paths illustrated in FIG. 4) may be embodied as any type of signal paths capable of facilitating communication between the various components of the operation monitor data server 108. For example, the signal paths may be embodied as any number of point-to-point links, wires, cables, light guides, printed circuit board traces, vias, bus, intervening devices, and/or the like.

The memory 404 of the operation monitor data server 108 may be embodied as, or otherwise include, one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 404 is communicatively coupled to the I/O subsystem 402 via a number of signal paths. Although only a single memory device 404 is illustrated in FIG. 4, the operation monitor data server 108 may include additional memory devices in other embodiments. Various data and software may be stored in the memory 404. For example, one or more operating systems, applications, programs, libraries, and drivers that make up the software stack executed by the processor 400 may reside in memory 404 during execution.

The data storage 406 may be embodied as any type of device or devices configured for the short-term or long-term storage of data such as, for example, memory devices and circuits, memory cards, hard disk drives, solid-state drives, or other data storage devices. In the illustrative embodiment, the operation monitor data server 108 stores the received sensor data and generated operation data in the data storage 406.

The communication circuitry 408 of the operation monitor data server 108 may include any number of devices and circuitry for enabling communications between the operation monitor data server 108 and the sensor controller 106, the remote mobile communication device 112, and the remote computer 114. The communication circuitry 408 may be configured to use any one or more communication technology and associated protocols to communicate with the other devices of the system 100.

In some embodiments, the operation monitor data server 108 may also include one or more peripheral devices 410. Such peripheral devices 410 may be embodied as any type of peripheral device commonly found in a computer or sever. For example, the peripheral devices 410 may include a keyboard, display, mouse, audio device, and/or other components.

Figure 5:
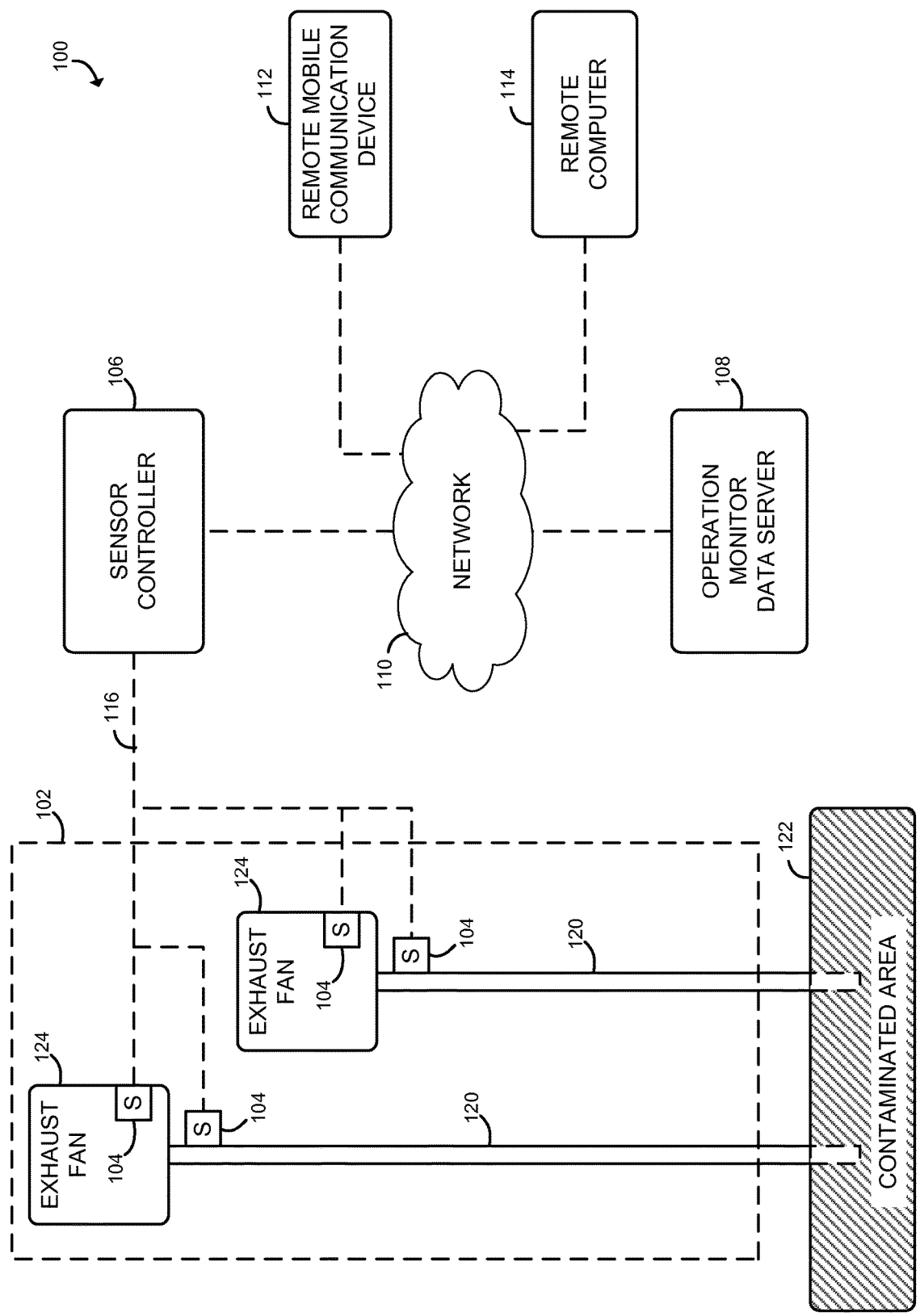
FIG. 5 is a simplified block diagram of another embodiment of the system of FIG. 1.

Although the illustrative system 100 has been illustrated in FIG. 1 and described above as having a single sensor module 104 and sensor controller 106, it should be appreciated that the system 100 may include additional sensor modules 104 and sensor controllers 106 depending on, for example, the particular type and/or implementation of the system 100 (e.g., the size and complexity of the air contaminant mitigation system 102 to be monitored). For example, as shown in FIG. 5, the system 100 may include a plurality of sensor modules 104, each of which may be connected to the same or different air conduits 120 and/or exhaust fans 124. For example, in some embodiments, the air contaminant mitigation system 102 may include a plurality of air conduits 120, each of which may have a corresponding exhaust fan 124 coupled thereto. In such embodiments, a separate sensor module 104 may be coupled to each exhaust fan 124 and/or each air conduit 120 to detect sensor conditions of the air contaminant mitigation system 102 as discussed above. In the illustrative embodiment of FIG. 5, each sensor module 104 transmits the sensor signals (or sensor data) to the same sensor controller 106 via the communication link 116, which may be embodied as a wired or wireless communication link. That is, a single sensor controller 106 may be configured to monitor sensor signals generated from a plurality of sensor modules 104 coupled to the same or different components of the air contaminant mitigation system 102.

Figure 6:
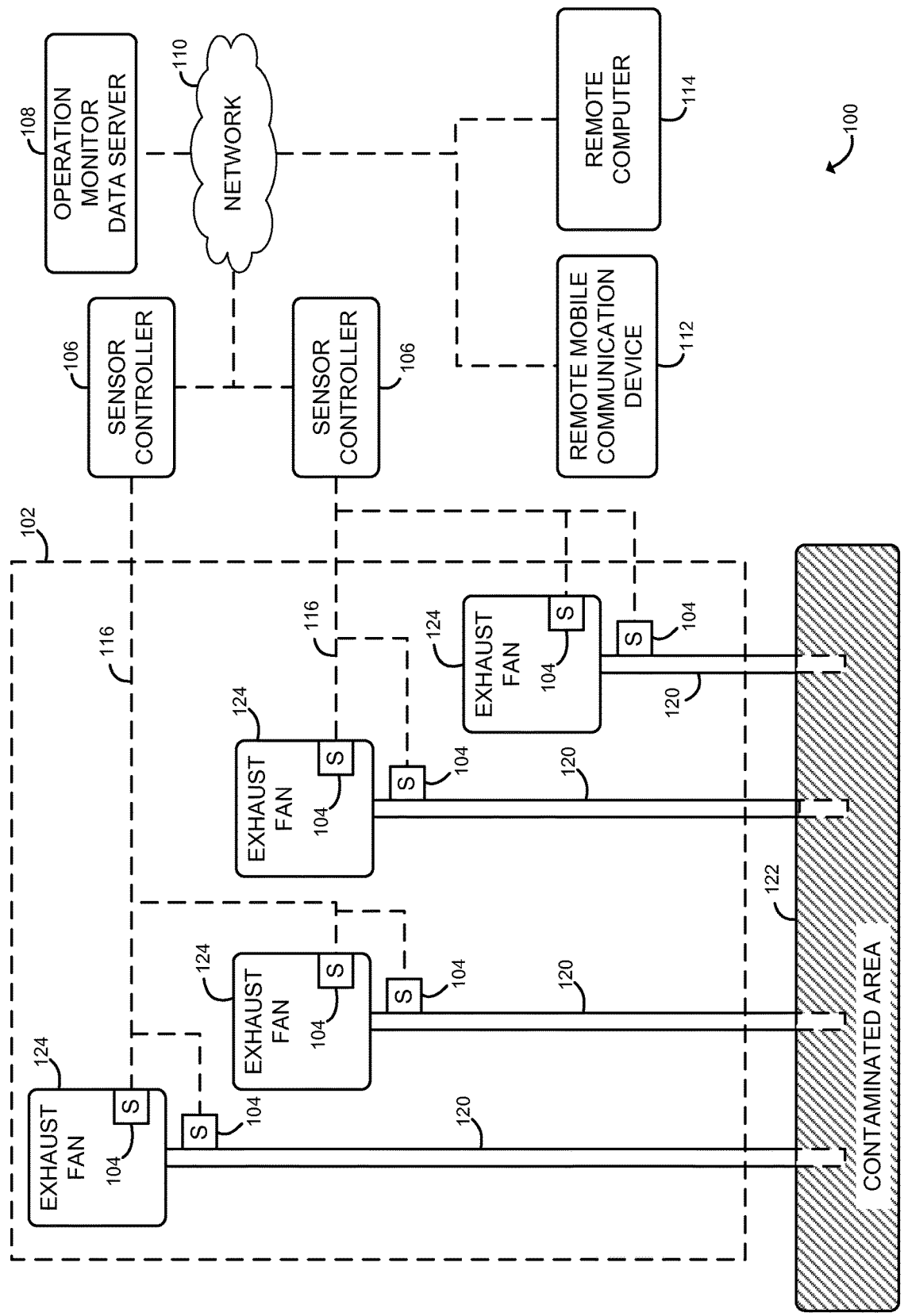
FIG. 6 is a simplified block diagram of yet another embodiment of the system of FIG. 1.

Additionally, in some embodiments, the system 100 may include multiple sensor controllers 106 as shown in FIG. 6. For example, in implementations including a large number of sensor modules 104 and/or wherein the sensor modules 104 are located from each other by a large distance, a plurality of sensor controllers 106 may be used to monitor the sensor modules 104. As such, some of the sensor modules 104 may be configured to communicate sensor signals and/or data to one of the sensor controller 106, and other sensor modules 104 may be configured to communicate sensor signals and/or data to another sensor controller 106. Again, such communications may be embodied as wired or wireless communications depending on the type of communication link 116 used to communicate such data. Each of the sensor modules 104 is configured to transmit the sensor data to the operation monitor data server 108 over the network 110 as discussed above. Further, in some embodiments, the system 100 may include multiple operation monitor data servers 108, which may receive data from the same or different sensor controllers 106. Accordingly, it should be appreciated that the system 100 may include one or more sensor modules 104, one or more sensor controllers 106, and/or one or more operation monitor data servers 108 depending on the specific implementation (e.g., the type, size, and/or complexity of the air contaminant mitigation system 102).

Figure 7:
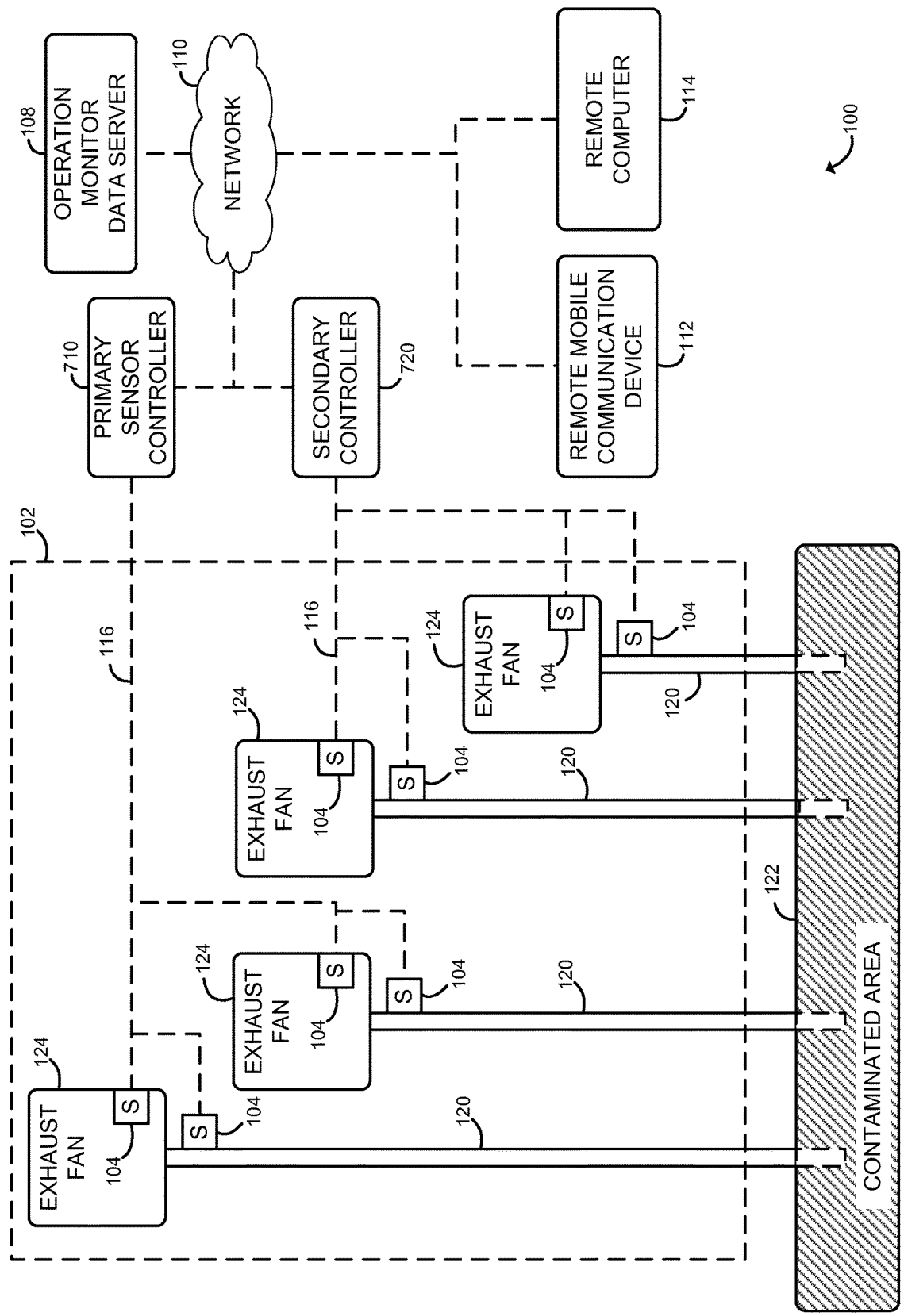
FIG. 7 is a simplified block diagram of yet another embodiment of the system of FIG. 1 including a primary sensor controller and a secondary sensor controller.

For example, one illustrative system 100 including multiple sensor controllers 106 is shown in FIG. 7. The illustrative system 100 of FIG. 7 includes a primary sensor controller 710 and a secondary sensor controller 720. The primary sensor controller 710 and the secondary sensor controller 720 (or any other sensor controller 106) may be embodied as any type of controller or control circuit including, for example, a process automation computer, a programmable logic controller (PLC), a computer, a laptop computer, a server, and/or other computing device. For example, in some embodiments, one or more of the primary sensor controller 710, the secondary sensor controller 720, and/or any other sensor controller 106 may be embodied or otherwise include a PLC having an integrated human-machine interface (e.g., built-in display, control panel, keyboard, touch screen, and/or any other type of human-machine interface for displaying data or controlling the PLC) such as for example, the Vision120™ PLC (Part No. V120-22-R1), which is commercially available from Unitronics, Ltd. of Israel. In such embodiments, some of the sensor modules 104 may be configured to communicate sensor signals and/or data to the primary sensor controller 710, and other sensor modules 104 may be configured to communicate sensor signals and/or data to the secondary sensor controller 720. Such communications may be embodied as wired or wireless communications depending on the type of communication link 116 used to communicate such data. Each of the sensor modules 104 is configured to transmit the sensor data to one of the sensor controllers 106 (e.g., the primary sensor controller 710 and/or the secondary sensor controller 720) and/or to the operation monitor data server 108 over the network 110 as discussed above. Of course, it should be appreciated that the system 100 may include any number of sensor modules 104, any number of sensor controllers 106, and/or any number of operation monitor data servers 108 depending on the specific implementation (e.g., the type, size, and/or complexity of the air contaminant mitigation system 102). Additionally, it should be appreciated that the primary sensor controller 710 and the secondary sensor controller 720 may be embodiments of the sensors controllers 106 and, as a result, may include components and functionality similar to that which was described above in regard to the sensor controllers 106.

In some embodiments, the primary sensor controller 710 may be embodied as a master programmable logic controller (PLC) and the secondary sensor controller 720 may be embodied as a slave PLC. In such embodiments, the primary sensor controller 710 may communicate with the secondary sensor controller 720 via wired or wireless communications. In embodiments wherein the primary sensor controller 710 and the secondary sensor controller 720 communicate via wireless communications, the primary sensor controller 710 and secondary sensor controller 720 may use any suitable wireless communication protocol, technology, and/or circuitry to communicate (e.g., non-licensed communications, spread spectrum, frequency hopping, frequency-hopping spread spectrum, and/or the like). For example, in some embodiments, the primary sensor controller 710 and the secondary sensor controller 720 may use wireless protocols such as ZigBee, Wi-Fi™, Z-Wave®, Bluetooth®, infrared, and/or the like for communications. In some embodiments, one or more of the primary sensor controller 710, the secondary sensor controller 720, and/or any other sensor controller 106 may include wireless communication circuitry configured with frequency-hopping spread spectrum communication functionality such as, for example, the DX80DR9M-H MultiHop 900 Mhz Radio (Part No. 11431) and/or the DX80DR9M-HB1 Radio Board (Part No. 17420), which are commercially available from Banner Engineering Corp. of Minneapolis, Minn. In some embodiments, one or more of the primary sensor controller 710 and the secondary sensor controller 720 may also communicate with one or more of the sensors modules 104 using such wireless communication protocols.

In embodiments wherein the primary sensor controller 710 and the secondary sensor controller 720 communicate via wired communications, the primary sensor controller 710 and the secondary sensor controller 720 may use any suitable wired communication protocol or technology to communicate (e.g., Ethernet, power line networking, etc.). In one embodiment, the primary sensor controller 710 and the secondary sensor controller 720 may communicate with each other via a serial communications protocol such as, for example, the Modbus protocol and/or any other suitable master/slave protocol. To do so, the primary sensor controller 710 may be communicatively coupled to the secondary sensor controller 720 via a hardwired network connection such as, for example an RS-485 connection. Of course, it should be appreciated that any other type of hardwired network connection may be used to communicatively couple the primary sensor controller 710 to the secondary sensor controller 720. Additionally, it should be appreciated that the primary sensor controller 710 may be communicatively coupled to any number of secondary sensor controllers 720. For example, in some embodiments, the primary sensor controller 710 may be communicatively coupled to more than one secondary sensor controller 720. For example, in one embodiment, the primary sensor controller 710 may be communicatively coupled to up to nine secondary sensor controllers 720. Of course, it should be appreciated that the primary sensor controller 710 may be communicatively coupled to any number of secondary sensor controllers 720. Additionally, in some embodiments, one or more of the primary sensor controller 710 and the secondary sensor controller 720 may also communicate with one or more of the sensors 104 using such wired communication protocols.

Additionally, in some embodiments, one or more of the primary sensor controller 710, the secondary sensor controller 720, and/or any other sensor controller 106 may be configured to communicate (e.g., transmit sensor data, receive remote commands, etc.) with one or more of the operation monitor data server 108, the remote mobile communication device 112, and/or the remote computer 114 via the network, which as discussed above, may be embodied as, or otherwise include, a cellular data network (e.g., a GSM cellular data network, a CDMA cellular data network, an LTE cellular data network, and/or the like). In such embodiments, one or more of the primary sensor controller 710, the secondary sensor controller 720, and/or any other sensor controller 106 may include cellular communication circuitry (e.g., the cellular communication circuit 306) such as, for example, the quad-band GPRS/GSM kit (Part No. GSM-KIT-41J), which is commercially available from Unitronics Ltd. of Israel, for communicating via the cellular network.

Figure 8:
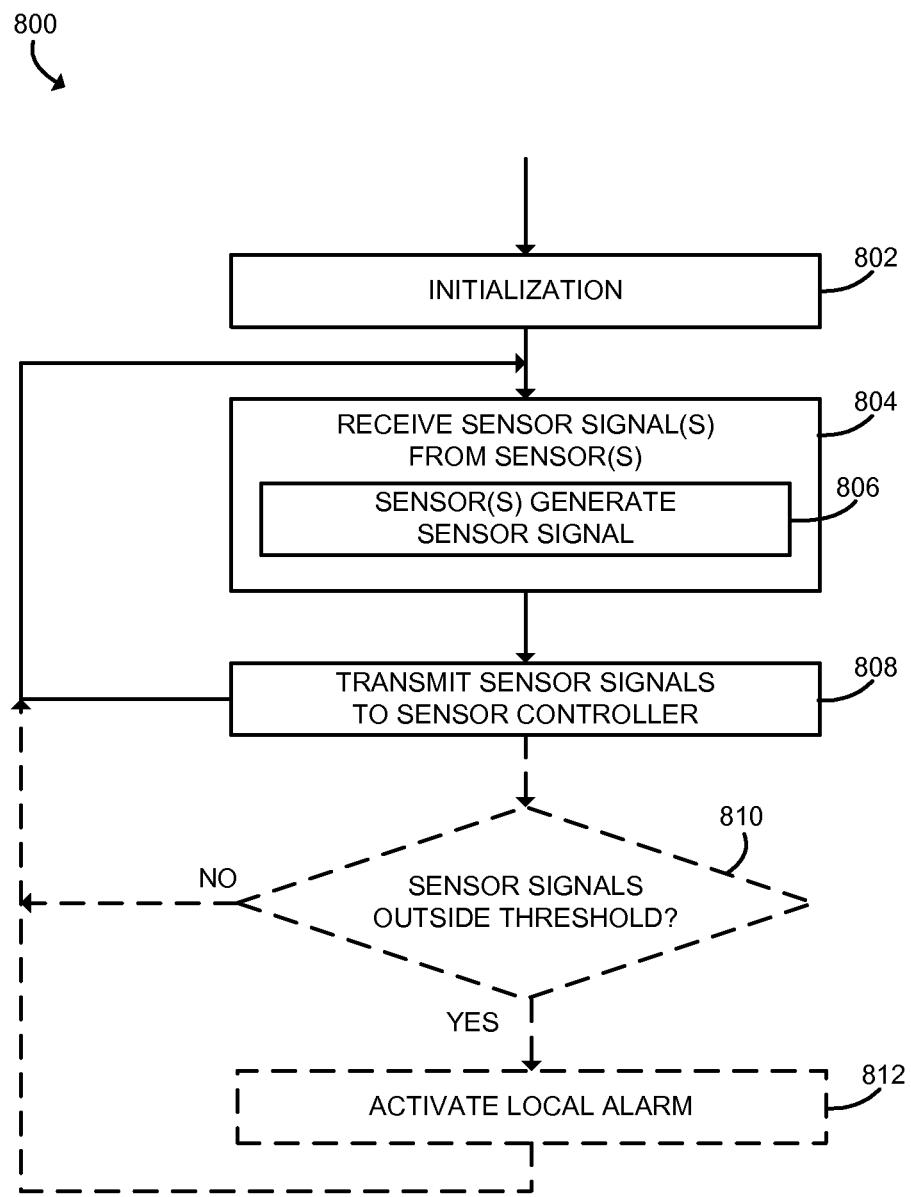
FIG. 8 is a simplified flow diagram of at least one embodiment of a method for generating sensor signals that may be executed by the sensor module of FIG. 2.

Referring now to FIG. 8, in use, each sensor module 104 of the system 100 may execute a method 800 for generating sensor signals indicative of a condition of the air contaminant mitigation system 102. The method 800 begins with block 802 in which the sensor module 104 is initialized. That is, the sensor module 104 may perform initial validation checks to ensure proper operation of the sensors 200 and/or communication circuit 202. Subsequently, in block 804, the sensor signals are received from each of the sensor 200. That is, the sensors 200 generate sensor signals in block 806 in response to the corresponding monitored condition of the air contaminant mitigation system 102, which are received by the communication circuit 202. As discussed above, the type of sensor signals generated in block 806 may depend on the type of sensor and the particular sensor condition being monitored. In embodiments in which the sensor(s) 200 is embodied as a current sensor, the sensor signals may be embodied as current measurements (e.g., current amplitude). Alternatively, in embodiments in which the current sensor(s) 200 is embodied as an air pressure sensor, the sensor signals may be embodied as pressure measurements.

Regardless, in block 608, the sensor signals are transmitted to the sensor controller 106 via the communication circuit 202. As discussed above, in some embodiments, the sensor module 104 may transmit the sensor signals in real-time or near real-time. Alternatively, the sensor module 104 may periodically transmit the sensor signals to the sensor controller 106. Additionally, in some embodiments, the sensor module 104 may transmit the sensor signals to the sensor controller 106 in response to receipt of a query from the sensor controller 106.

In some embodiments, the method 800 may also include block 810 in which the sensor module 104 determines whether the sensor signals are outside a reference threshold. To do so, the sensor module 104 may compare the sensor signals (e.g., in real-time or near real-time) to a pre-defined threshold value. If the sensor signals are within the threshold, the method 800 loops back to block 804 in which additional sensor signals are received. However, if one or more sensor signals are determined to be outside the reference threshold in block 810, the method 800 advances to block 812 in which the sensor module 104 may activate the local alarm using the alarm circuit 204. Additionally, as discussed above, the sensor module 104 may transmit an alert to the sensor controller 106 to notify the sensor controller 106 of the alarm condition in some embodiments. As discussed above, the local alarm may be embodied as an audible alarm (e.g., a buzzer), a visual alarm (e.g., a blinking light), or other alarm capable to bring attention to the sensor module 104.

Figure 9:
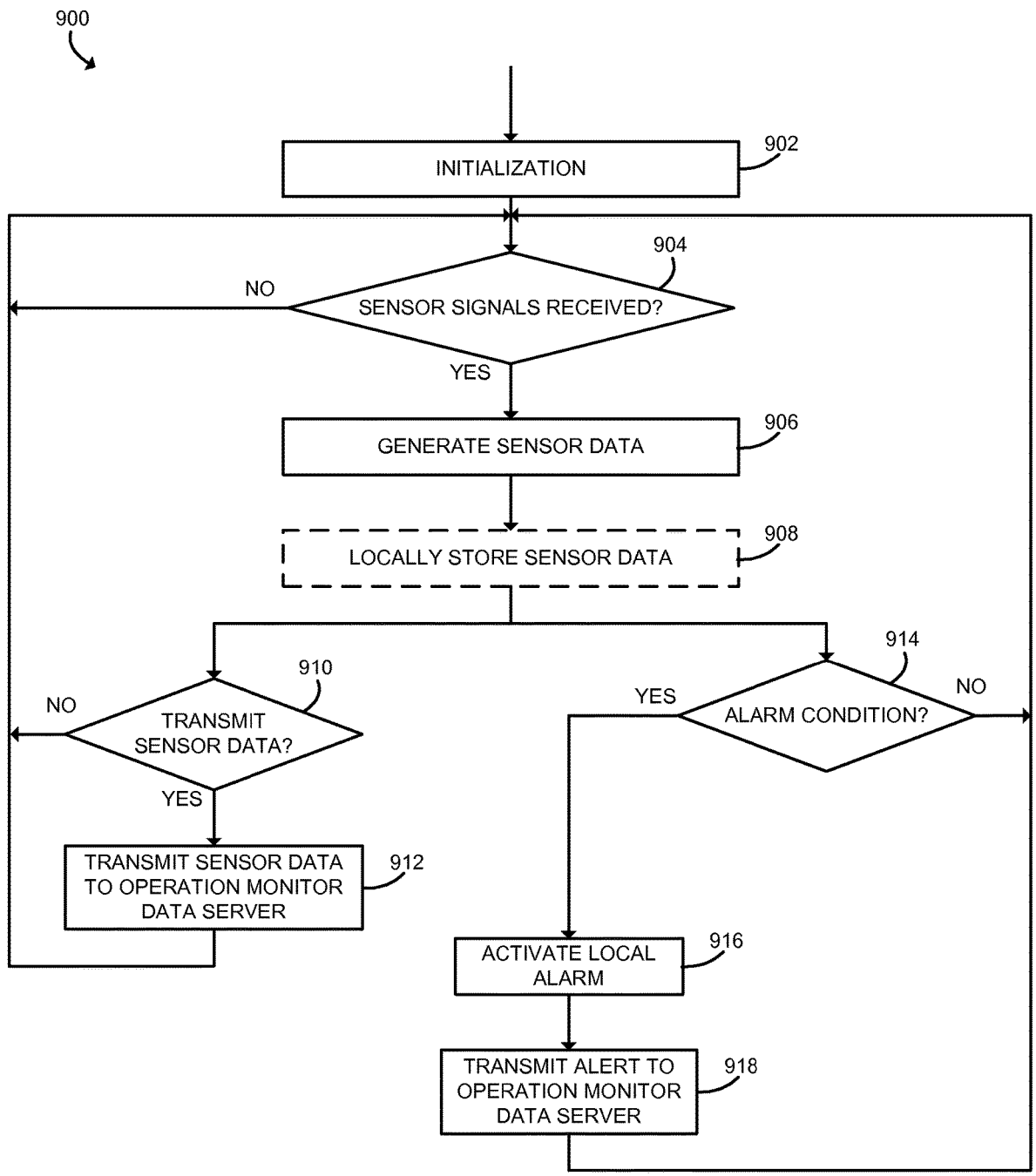
FIG. 9 is a simplified flow diagram of at least one embodiment of a method for monitoring and transmitting sensor data that may be executed by the sensor controller of FIG. 3.

Referring now to FIG. 9, in use, each sensor controller 106 is configured to execute a method 900 for generating sensor data indicative of a condition of an air contaminant mitigation system 102. The method 900 begins with block 902 in which the sensor controller 106 is initialized. That is, the sensor controller 106 may perform initial validation checks to ensure proper operation of the communication circuit 300 and/or control circuit 302. Subsequently, in block 904, the sensor controller 106 determines whether any sensor signals have been received from one or more sensor modules 104. If so, the method 900 advances to block 906 in which the sensor controller 106 generates sensor data based on the sensor signals. In some embodiments, the sensor data may be embodied as, or directly represent, the sensor signals. In other embodiments, the sensor data may be indicative of the sensor signals (e.g., an average of the received sensor signals over a referenced time period, an aggregation value of the sensor signals, etc.). In some embodiments, the sensor controller may store the generated sensor data in the local data storage 314 in block 908.

In block 910, the sensor controller 106 determines whether to transmit the sensor data to the operation monitor data server 108. In some embodiments, the sensor controller 106 may continually transmit the sensor data to the operation monitor data server 108. Alternatively, as discussed above, the sensor controller 106 may periodically transmit the sensor data to the operation monitor data server 108. Additionally, in some embodiments, the sensor controller 106 may transmit the sensor data to the operation monitor data server 108 in response to a query received from the server 108. Regardless, if it is determined to transmit the sensor data in block 910, the method 900 advances to block 912 in which the sensor controller 106 transmits the sensor data to the operation monitor data server 108. The method subsequently loops back to block 904 to receive additional sensor signals from the sensor modules 104.

In some embodiments, the sensor controller 106 may be configured to detect an alarm condition based on the sensor signals and/or communications (or lack thereof) received from the sensor modules 104. In such embodiments, the method 900 may also advance from block 906, 908 to block 914 in which the sensor controller 106 determines whether an alarm condition is present. As discussed above, such determination may be based on the sensor signals received from the sensor modules 104, the sensor data generated (and/or stored) by the sensor controller 106, and/or on the communications received from the sensor modules 104. For example, in some embodiments, the sensor controller 106 may compare the received sensor signals to a pre-defined threshold value to determine whether the sensor signals (or sensor data) is within an acceptable range or otherwise at an acceptable value. Additionally or alternatively, the sensor controller 106 may compare the generated sensor data to a pre-defined threshold value (e.g., an expected average value) to determine whether the sensor modules 104 are functioning properly over time. Additionally, in some embodiments, the sensor controller 106 may determine that an alarm condition is occurring if no transmission is received from the sensor module 104 within an expected time period or if an alert is received from the sensor module 104 as discussed above. In some embodiments, the sensor controller 106 may be configured to detect an alarm condition based on sensing an incoming power loss. For example, the sensor controller 106 may be configured to detect the loss of incoming A/C mains power (or D/C power if operating on battery power or another power source) and generate an alarm condition or an error.

If the sensor controller 106 determines that an alarm condition is occurring in block 914, the method 900 advances to block 916 in which the local alarm 320 is activated. As discussed above, the local alarm 320 may be embodied as a visual, audible, or tactile alarm. Additionally, in some embodiments, the sensor controller 106 may transmit an alert to the operation monitor data server 108 in block 918 to notify the server 108 of the alarm condition.

Figure 10:
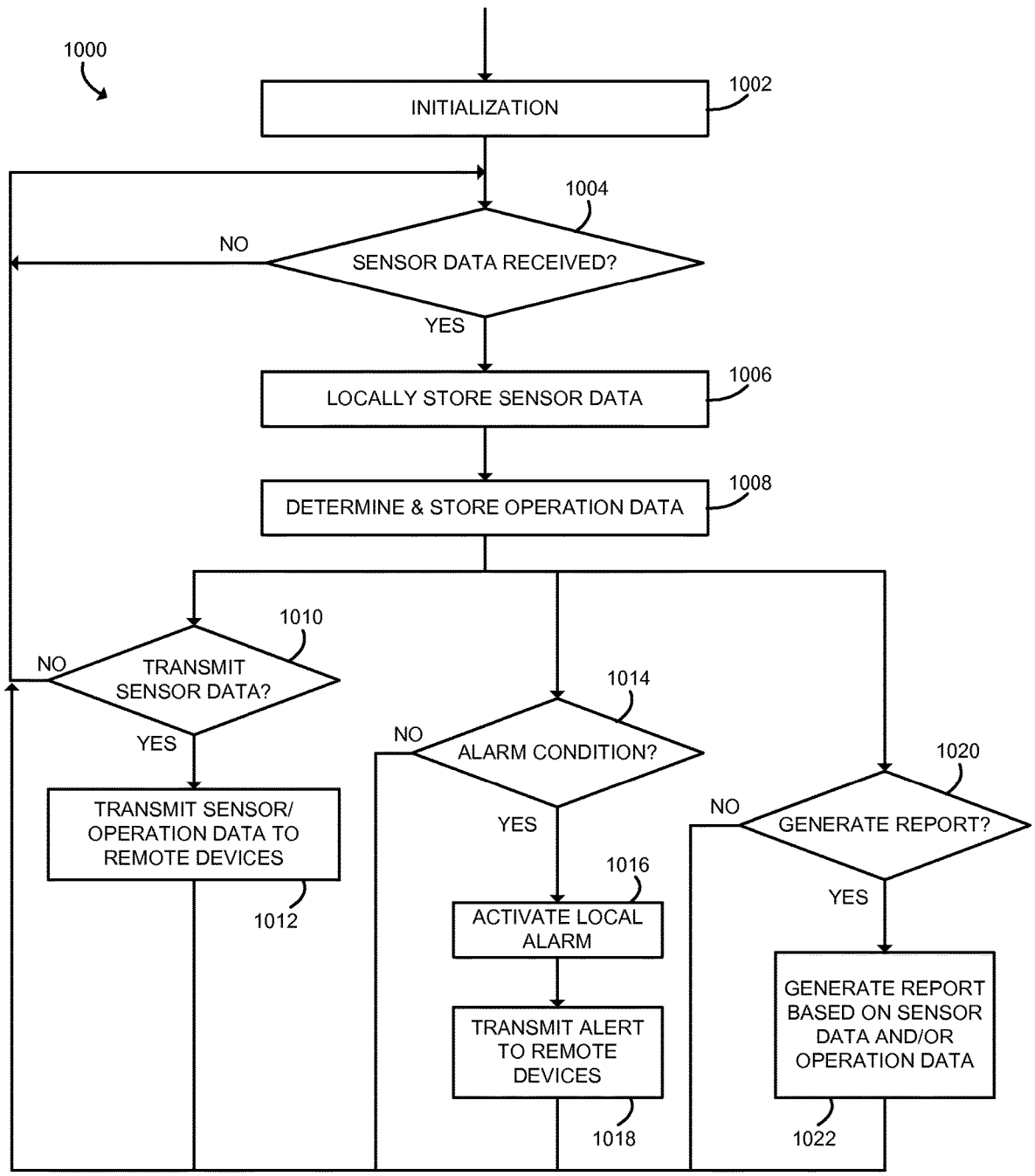
FIG. 10 is a simplified flow diagram of at least one embodiment of a method for monitoring air quality of a rehabilitated location that may be executed by the operation monitor data server of FIG. 4.

Referring now to FIG. 10, in use, the operation monitor data server 108 may execute a method 1000 for monitoring operation of an air contaminant mitigation system 102. The method 1000 begins with block 1002 in which the operation monitor data server 108 is initialized. For example, the operation monitor data server 108 may perform initial validation checks to ensure proper operation. Subsequently, in block 1004, the operation monitor data server 108 determines whether any sensor data has been received from the sensor controller(s) 106. If so, the method 1000 advances to block 1006 in which the operation monitor data server 108 stores the received sensor data in the data storage 406.

In block 1008, the operation monitor data server 108 may determine and store operation data. The operation data may be based on the sensor data received in block 1006 and/or on other data or criteria. The operation data is indicative of the operation state of the system 100. For example, the operation data may be indicative of the length of time of operation of the sensor modules 104, the sensor controller 106, and/or the operation monitor data server 108 itself. The operation data may also include notification of any alerts or alarm conditions detected by the sensor module 104 and/or the sensor controller 106.

Subsequently, the illustrative method 1000 advances to blocks 1010, 1014, and 1020, which may be executed contemptuously with each other. In block 1010, the operation monitor data server 108 determines whether to transmit the sensor data and/or operation data to one or more remote devices (e.g., the remote mobile communication device 112 and/or the remote computer 114). In some embodiments, the operation monitor data server 108 may continually transmit the sensor data and/or operation data to such remote devices. Alternatively, the operation monitor data server 108 may periodically transmit the sensor data and/or operation data to the remote devices. Additionally, in some embodiments, the operation monitor data server 108 may transmit the sensor data and/or operation data to the remote devices in response to a query received from the devices. For example, in one embodiment, the operation monitor data server 108 may maintain a web portal to allow access-on-demand to the sensor data and/or operation data by the remote devices. Such access may be protected or otherwise privileged. As such, a user (e.g., customer) may access the operation monitor data server 108 via the web portal to query and/or review the sensor data and/or operation data collected by the operation monitor data server 108 about their particular location.

If the operation monitor data server 108 determines that the sensor and/or operation data should be transmitted in block 1010, the method 1000 advances to block 1012 in which the operation monitor data server 108 transmits (or otherwise allows access to) the sensor data and/or operation data to the remote devices. The method 1000 subsequently loops back to block 1004 to receive additional sensor data from the sensor controller 106.

Referring back to block 1014, the operation monitor data server 108 may be configured to detect or otherwise determine the presence of an alarm condition in some embodiments. For example, in some embodiments, the operation monitor data server 108 may determine the presence of an alarm condition based on the sensor data, similar to the sensor controller 106 as discussed above. That is, the operation monitor data server 108 may compare the sensor data to a reference threshold and determine the presence of an alarm condition if the sensor data is outside the reference threshold. Additionally or alternatively, the operation monitor data server 108 may monitor the sensor data over a time period and determine the presence of an alarm condition in response to the sensor data viewed over the reference time period (e.g., the average of the sensor data is below a threshold value or is falling at a reference rate). Alternatively, the operation monitor data server 108 may determine the presence of an alarm condition based on an alert received from the sensor controller 106.

In some embodiments, the sensor controller 106 may be configured to detect an alarm condition based on the sensor signals and/or communications (or lack thereof) received from the sensor modules 104. In such embodiments, the method 1000 may also advance from block 1006, 1008 to block 1014 in which the sensor controller 106 determines whether an alarm condition is present. As discussed above, such determination may be based on the sensor signals received from the sensor modules 104, the sensor data generated (and/or stored) by the sensor controller 106, and/or on the communications received from the sensor modules 104. For example, in some embodiments, the sensor controller 106 may compare the received sensor signals to a pre-defined threshold value to determine whether the sensor signals (or sensor data) is within an acceptable range or otherwise at an acceptable value. Additionally or alternatively, the sensor controller 106 may compare the generated sensor data to a pre-defined threshold value (e.g., an expected average value) to determine whether the sensor modules 104 are functioning properly over time. Additionally, in some embodiments, the sensor controller 106 may determine that an alarm condition is occurring if no transmission is received from the sensor module 104 within an expected time period or if an alert is received from the sensor module 104 as discussed above. Regardless, if the operation monitor data server 108 determines that an alarm condition is occurring in block 1014, the method 900 advances to block 1016 in which the operation monitor data server 108 may activate a local alarm. Similar to the sensor controller 106, the local alarm of the operation monitor data server 108 may be embodied as an audible, visual, tactile, or other alarm. Additionally, in some embodiments, the operation monitor data server 108 may transmit an alert to the remote devices (e.g., the remote mobile communication device 112 and/or the remote computer 114) in block 1018 to notify the remote devices of the alarm condition.

Referring back to block 1020, as discussed above, the operation monitor data server 108 may be configured to generate reports based on the sensor data, operation data, and/or other data or parameters of the system 100. As such, in block 1020, the operation monitor data server 108 determines whether to generate such a report. If so, the method 1000 advances to block 1022 in which the report is generated. Additionally, in some embodiments, the report may be transmitted to a remote device (e.g., the remote mobile communication device 112 and/or the remote computer 114) in block 1022. Such reports may provide indication of the sensor data (e.g., average sensor data values over time), the operation state of the air contaminant mitigation system 102 (e.g., the length of "in-operation-time" of the air contaminant mitigation system 102), the operation state of various components of the system 100 (e.g., the "in-operation-time" of the sensor modules 104 and/or the sensor controller 106), and/or other data. Such reports may be formatted and include data as required by various local and federal agencies to validate proper vapor intrusion mitigation of the rehabilitated location.

Figure 11:
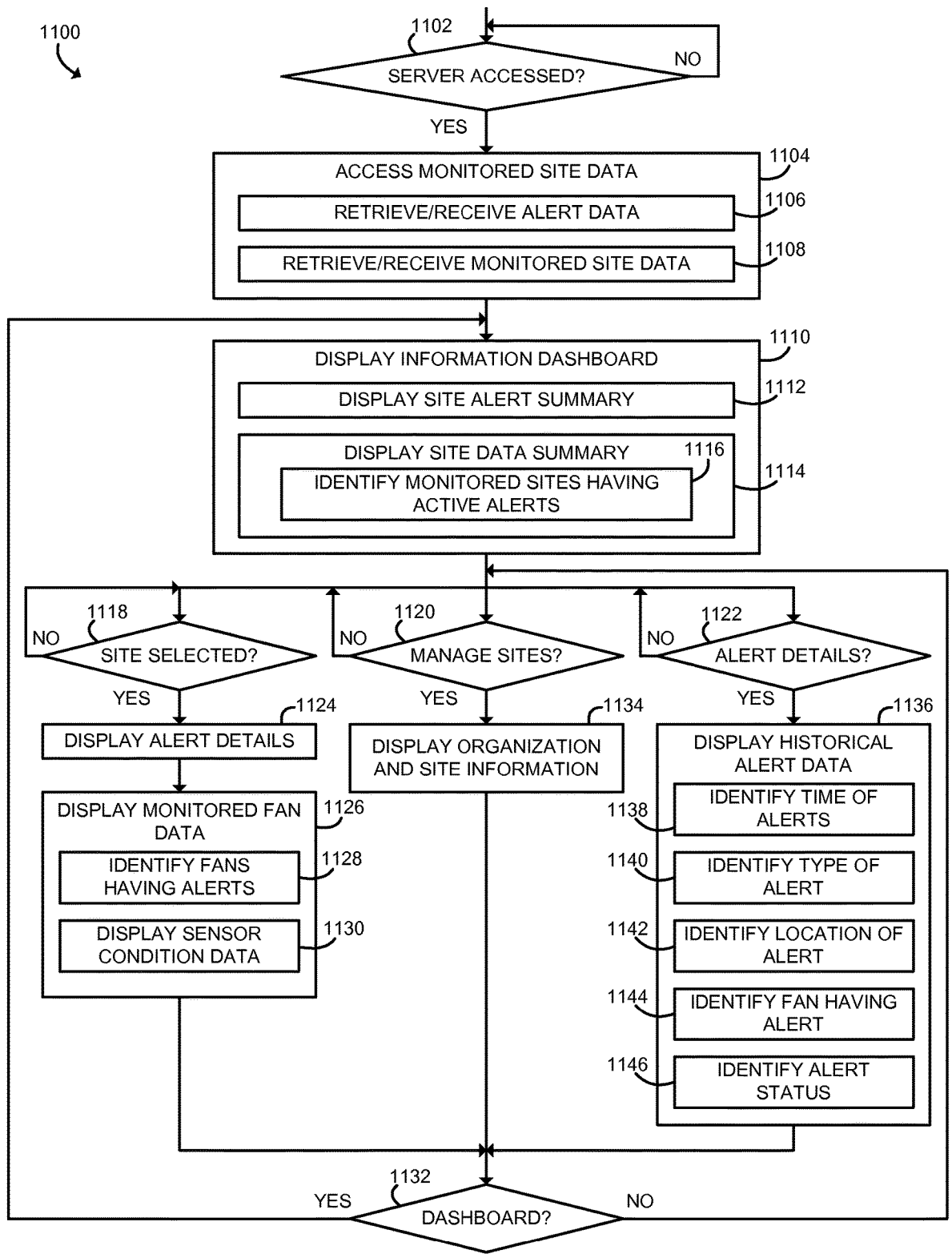
FIG. 11 is a simplified flow diagram of at least one embodiment of a method for providing monitored site data to a remote computer that may be executed by the operation monitor data server of FIG. 4.

Referring now to FIG. 11, as discussed above, the operation monitor data server 108 may provide a web portal accessible by one or more remote computer 114 to monitor alerts and overall condition of one or more air contaminant mitigation systems 102 located at various monitored sites. To do so, the operation monitor data server 108 may execute a method 1100 for providing monitored site data to a remote computer. The method 1100 begins with block 1102 in which the operation monitor data server 108 determines whether a remote computer 114 has requested access to the data server 108. If so, the method advances to block 1104. In block 1104, the operation monitor data server 108 accesses monitored site data. The monitored site data may include historical and/or real-time operation data relating to the operation conditions of any one or more monitored sites. For example, the monitored site data may be retrieved from the data storage 405 of the operation monitor data server 108 and/or currently received from one or more sensor controllers 106 from one or more monitored sites. The monitored site data may be embodied as any type of data relating to air contaminant mitigation systems 102 located at a monitored site. For example, in block 1106, the operation monitor data server 108 may retrieve or receive alert data. The alert data may be embodied as any type of data indicative of an alert or alarm condition generated by sensor module 104 and/or a sensor controller 106 or determined by the operation monitor data server 108 itself as discussed above (e.g., an alert indicative of a lack of periodic communication from a particular sensor controller 106). As discussed below, the alert data may include various data identifying the type of alert, the time and/or date at which the alert was generated, the location of the alert, and so forth. In block 1108, the operation monitor data server 108 may also retrieve or receive monitored site data. The monitored site data may be embodied as any additional data related to a particular monitored site and/or air contaminant mitigation systems 102 located at a particular monitored site including, for example, identification data of the monitored site, the length of time the air contaminant mitigation system 102 has been up, the date and time of a last fault or alert, and so forth.

After the monitored site data has been accessed in block 1104, the operation monitor data server 108 displays an information dashboard to the remote computer 114 in block 1110. To do so, the operation monitor data server 108 may transmit various information and data to the remote computer 114 to cause the remote computer 114 to display the information dashboard. The operation monitor data server 108 may use any suitable communication technology and protocol to do so including, for example, hypertext markup language (HTML), extensible markup language (XML), and/or other markup language to display the information to the remote computer 114. The information dashboard provides a summary of operation data related to various monitored sites and may include any type of useful information. For example, in some embodiments, the operation monitor data server 108 displays a site alert summary on the information dashboard in block 1112. The site alert summary may provide a quick overview of recent alerts that have been generated at, or otherwise related to, any one of the monitored sites (i.e., at any one of the monitored air contaminant mitigation systems 102). Additionally, in block 1114, the operation monitor data server 108 may display a site data summary. The site data summary may provide a quick overview of various monitored site information for each monitored site such as, for example, current status, length of up time, and date of last fault or alert. In some embodiments, in block 1116, the operation monitor data server 108 may also identity those monitored sites having an active alert or alarm condition. To do so, the operation monitor data server 108 may highlight or otherwise provide some indication of those sites having an active alarm (e.g., via the site alert summary and/or the site data summary).

Figure 12:
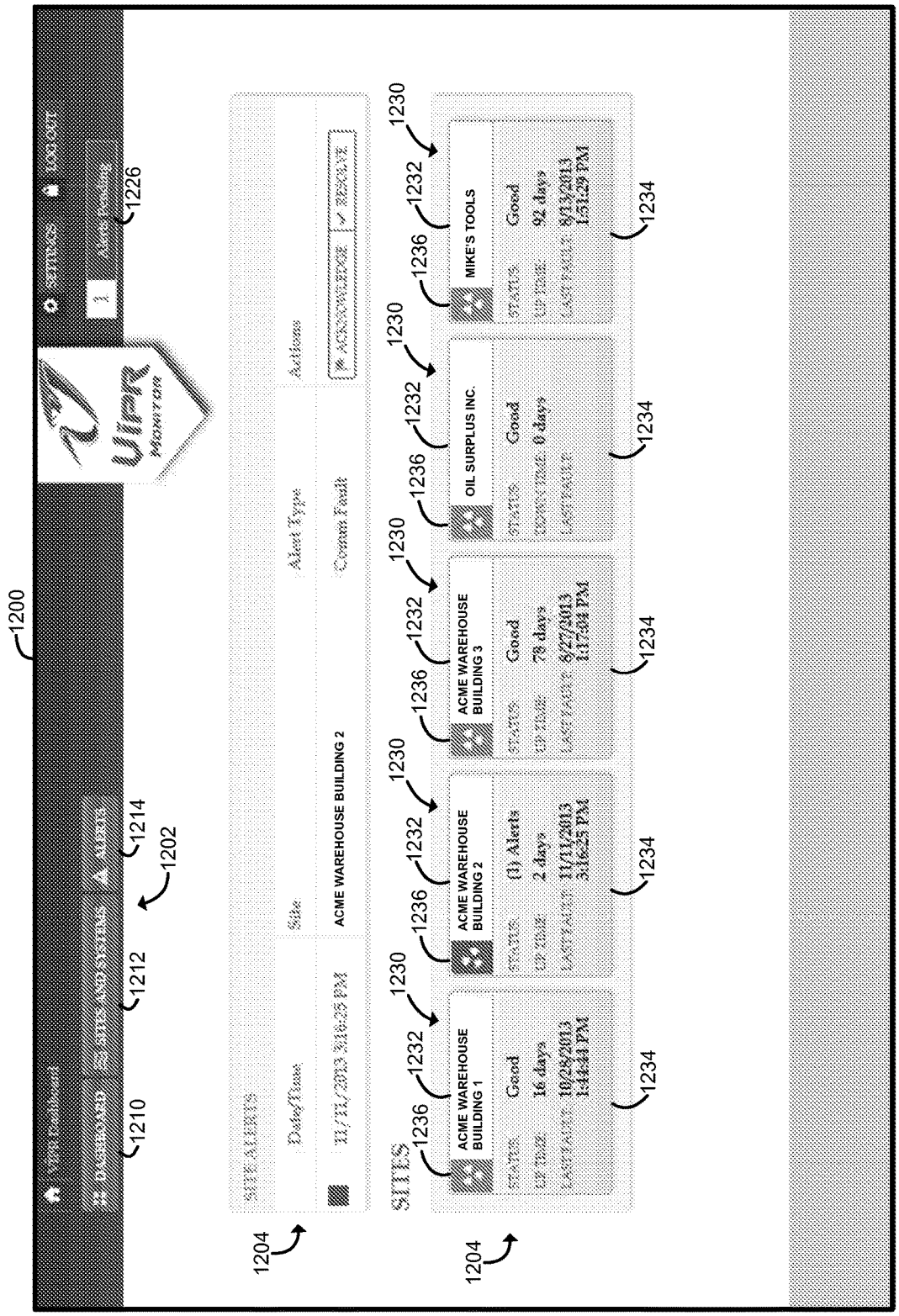
FIGS. 12-15 are illustrative user interface displays that may be generated by the operation monitor data server and displayed on the remote computer during execution of the method of FIG. 10.

Referring now to FIG. 12, an illustrative screen display of an information dashboard 1200 is shown. The information dashboard 1200 may be generated by the operation monitor data server 108, transmitted to the remote computer 114, and displayed thereon. The information dashboard 1200 includes a dashboard control panel 1202, a site alert summary 1204, and a site information summary 1206. The dashboard control panel 1202 includes several buttons, which are selectable by a user of the remote computer 114 to display different types of information. For example, the dashboard control panel 1202 includes a dashboard button 1210 to display the information dashboard 1200 (e.g., when the user has navigated away from the information dashboard 1200 display), a sites button 1212 to display monitored site information (see FIG. 14), and an alert button 1214 to display alert information (see FIG. 15).

The site alert summary 1204 displays summary information related to any recently occurring alerts generated at any of the monitored sites. The site alert summary 1204 may include any type of alert information useful in providing the user with an overview of the recent alerts. For example, the illustrative site alert summary 1204 includes the date and time of each alert, the site location (e.g., which particular monitored site or building of a monitored organization), and the type of alert (e.g., common fault, high-pressure fault, power fault, fan off fault, etc.). In some embodiments, the site alert summary 1204 may also include an alert action panel 1220, which may include one or more actions the user may select to respond to the particular alert. For example, in the illustrative embodiment, the alert action panel 1220 includes an acknowledge button 1222 and a resolve button 1224. The user may select the acknowledge button 1222 to mark the corresponding alert as "acknowledged" (i.e., the user is aware of the alert, but the alert may not have yet been responded to). Alternatively, the user may select the resolve button 1224 to mark the corresponding alert as "resolved" (i.e., the alert has been addressed or otherwise responded to). Of course, in other embodiments, other tools and action buttons may be included on the alert action panel 1220. In addition to the site alert summary 1204, the information dashboard 1200 may include an alert notification 1226, which provides the user with a quick overview of all unresolved alerts. For example, the illustrative information dashboard 1200 shows that one alert is still pending for the user's review.

The site information summary 1206 includes one or more monitored site widgets 1230, which provide overview information (e.g., operation data) for each monitored site. For example, each monitored site widget 1230 includes a name panel 1232, which includes the name of the monitored site (e.g., "ACME Warehouse Building 1," "ACME Warehouse Building 2", etc.). Additionally, each monitored site widget 1230 includes an information panel 1234, which includes a summary of site information. For example, in the illustrative embodiment of FIG. 12, each information panel 1234 includes a "status" field identifying whether any alerts are pending, an "up time" field identifying the length at which the air contaminant mitigation systems 10 of the monitored site has been operational since the last fault, and a "last fault" field identifying the date and time of the last fault of the air contaminant mitigation system 102 of the monitored site. Of course, in other embodiments, the information panel 1234 may include additional or other information related to the monitored site. Each monitored site widget 1230 also includes an alert status indicator 1236, which identifies whether the monitored site has any pending or active alerts. In the illustrative embodiment, the color of the alert status indicator 1236 is changed to indicate that that particular monitored site has a pending alert. For example, in the embodiment of FIG. 12, the monitored site "ACME Warehouse Building 1" has an alert status indicator 1236 that is colored blue to indicate that no alerts are pending or otherwise unresolved. However, the monitored site "ACME Warehouse Building 2" has an alert status indicator 1236 that is colored red to indicate that an alert is pending or otherwise unresolved. Additional information regarding the alert of the monitored site "ACME Warehouse Building 2" is also displayed in the site alert summary 1204 as discussed above.

Referring now back to FIG. 11, after the information dashboard is displayed to the user of the remote computer 114, the method 1100 advances to blocks 1118, 1120, and 1122. In block 1118, the operation monitor data server 108 monitors for selection of the monitored site widgets 1230 of the site information summary 1206 displayed on the dashboard 1200. A user may select one of the monitored site widgets 1230 to access additional details regarding that particular monitored site. If the user selects one of the monitored site widgets 1230, the method 1100 advances to block 1124 in which the operation monitor data server 108 displays alert details regarding any present or historical alerts generated by the air contaminant mitigation system 102 of the selected monitored site. The alert details may include additional information relative to the site alert summary 1204 displayed on the information dashboard 1200 such as, for example, the particular exhaust fan or sensor causing the alert. Additionally, in block 1126, the operation monitor data server 108 displays monitored fan data to the user of the remote computer 114. As discussed above, each air contaminant mitigation system 102 of a monitored site may include one or more sensor modules 104, each of which monitor the operation of a corresponding exhaust fan (e.g., whether the fan is generating a suitable negative pressure, whether the fan is operational, etc.). As such, the operation monitor data server 108 may display detailed information regarding each monitored exhaust fan in block 1126. For example, in block 1128, the operation monitor data server 108 identify those exhaust fans having pending or unresolved alerts and display additional condition or operational information related to the corresponding sensor module 104. The additional alert and site information generated and displayed in blocks 1124-1130 provide detailed information to the user of the remote computing device 114, which may allow the user to respond to any alerts in a more effective manner.

Figure 13:
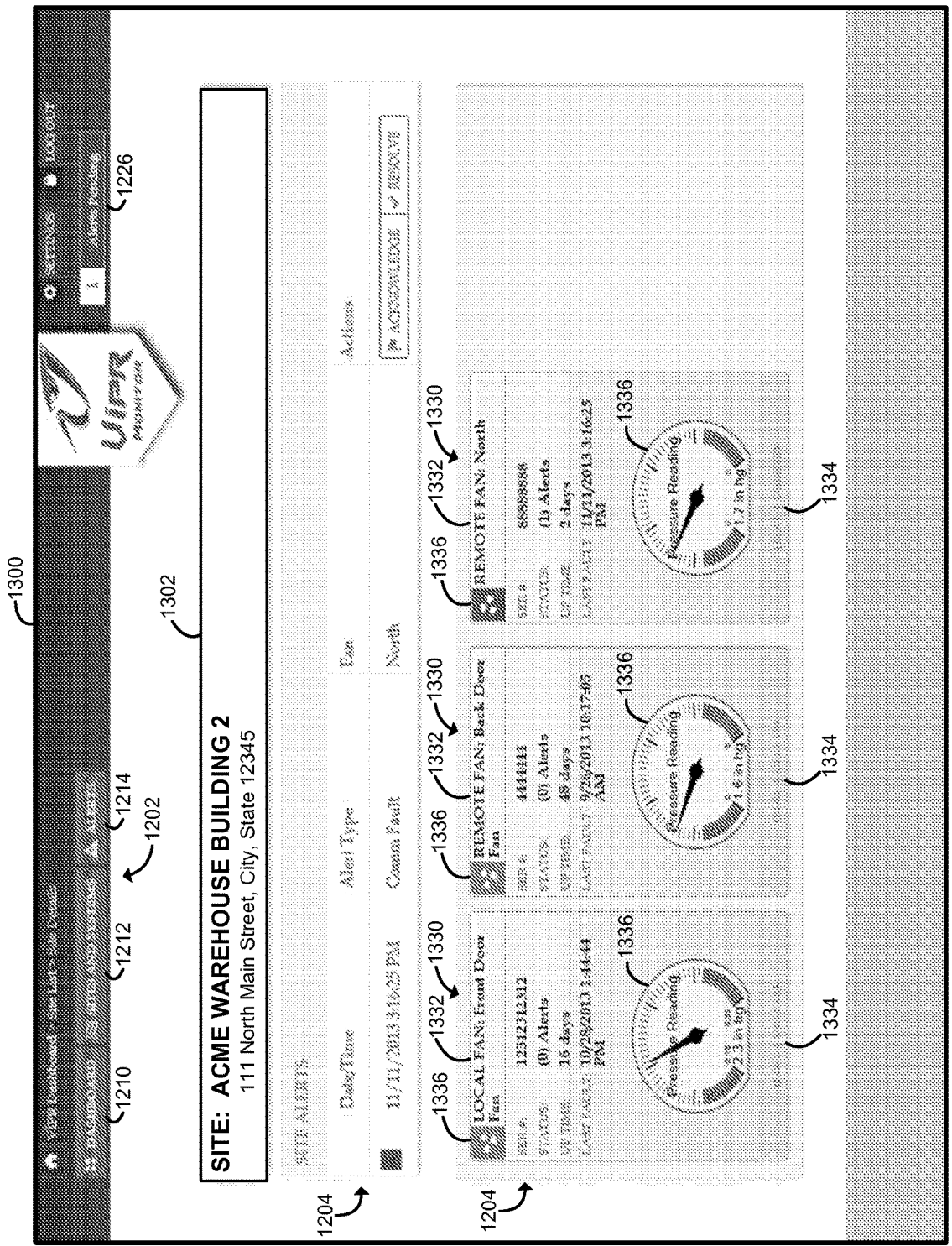

Referring now to FIG. 13, an illustrative screen display of a monitored site dashboard 1300 is shown. The monitored site dashboard 1300 includes a monitored site identity panel 1302, a monitored site alert report 1304, and an exhaust fan report 1306. The monitored site identity panel 1302 includes identity information of the selected monitored site. For example, the illustrative monitored site identity panel 1302 includes the name of the monitored site ("ACME Warehouse Building 2") and the address of the monitored site.

The monitored site alert report 1304 is similar to the site alert summary 1204 of the information dashboard 1200 and may include similar information. For example, the illustrative monitored site alert report 1304 includes the date and time of each alert, the type of alert, and the particular exhaust fan causing the alert. Additionally, in some embodiments, the site alert summary 1204 may include an alert action panel 1320, which may be similar to the alert action panel 1220 of the site alert summary 1204 of the information dashboard 1200.

The exhaust fan report 1306 includes a monitored fan widget 1330 for each monitored fan of the air contaminant mitigation system 102 of the monitored site. For example, in the illustrative example of FIG. 13, the monitored site "ACME Warehouse Building 2" includes an air contaminant mitigation system 102 having three monitored exhaust fans ("front door fan," "back door fan," "North fan"). As such, the exhaust fan report 1306 includes three monitored fan widgets 1330, one for each monitored fan. Each monitored fan widget 1330 includes a name panel 1332, which includes the name or other identifier of the monitored exhaust fan (e.g., "Local Fan: Front Door Fan," "Remote Fan: Back Door Fan," etc.). Additionally, each monitored fan widget 1330 includes an information panel 1334, which includes a summary of exhaust fan information. For example, in the illustrative embodiment of FIG. 13, each information panel 1334 includes a "serial" field identifying a serial number or other identity information of the monitored fan or corresponding sensor module 104, a "status" filed that identities the number of any pending or unresolved alerts corresponding to the monitored fan (e.g., generated by a corresponding sensor module 104), an "up time" field identifying the length of time for which that particular monitored fan has been operational since the last fault, and a "last fault" field identifying the date and time of the last fault of the corresponding monitored exhaust fan. Additionally, in some embodiments, the information panel 1334 may include a sensor condition graphic 1340, such as a pressure-reading graphic, that displays the current sensor condition measurement or reading in a graphical or numerical form. For example, the illustrative sensor condition graphic 1340 is embodied as a pressure gauge that shows the current pressure measurement of the corresponding sensor module 104. Of course, in other embodiments, the information panel 1334 may include additional or other information related to the monitored exhaust fan. Similar to the monitored site widgets 1230, each monitored fan widget 1330 includes an alert status indicator 1336, which identifies whether the monitored exhaust fan (or corresponding sensor module 104) has any pending or active alerts. Again, in the illustrative embodiment, the color of the alert status indicator 1336 is changed to indicate that that particular monitored site has a pending alert (e.g., a blue color may indicate no alerts, while a red color may indicate an active alert).

Referring now back to FIG. 11, after the alert details and monitored fan data have been displayed to the user of the remote computing device 114 in blocks 1124 and 1126, the method 1100 advances to block 1132. In block 1132, the operation monitor data server 108 determines whether the user has selected the dashboard button 1210 to return to the information dashboard 1200. If so, the method 1100 loops back to block 1110 in which the operation monitor data server 108 displays the information dashboard 1200 to the user of the remote computing device 114. If not, the method 1100 loops back to blocks 1118, 1120, and 1122 to monitor for other selections as discussed below.

Figure 14:
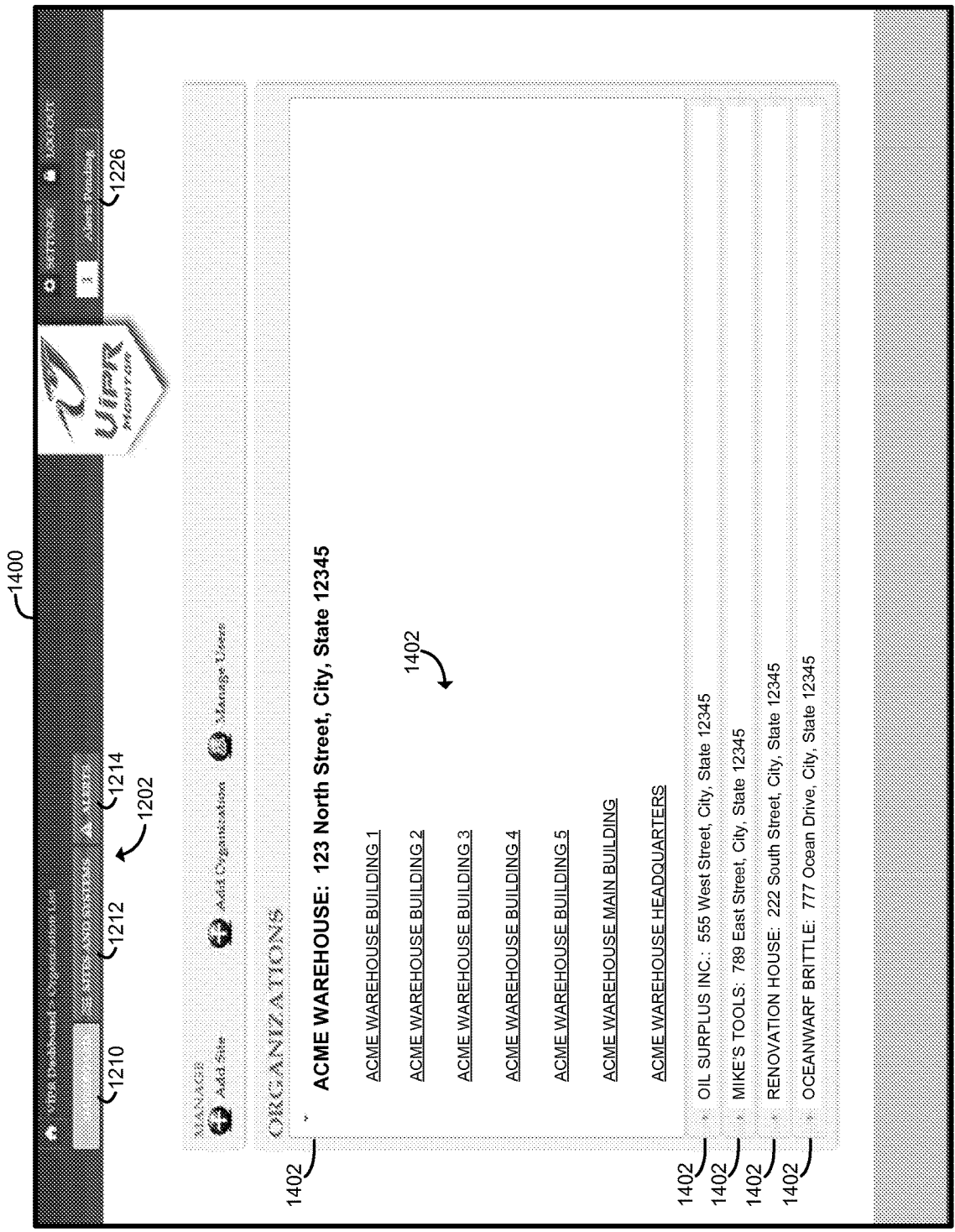
Figure 15:
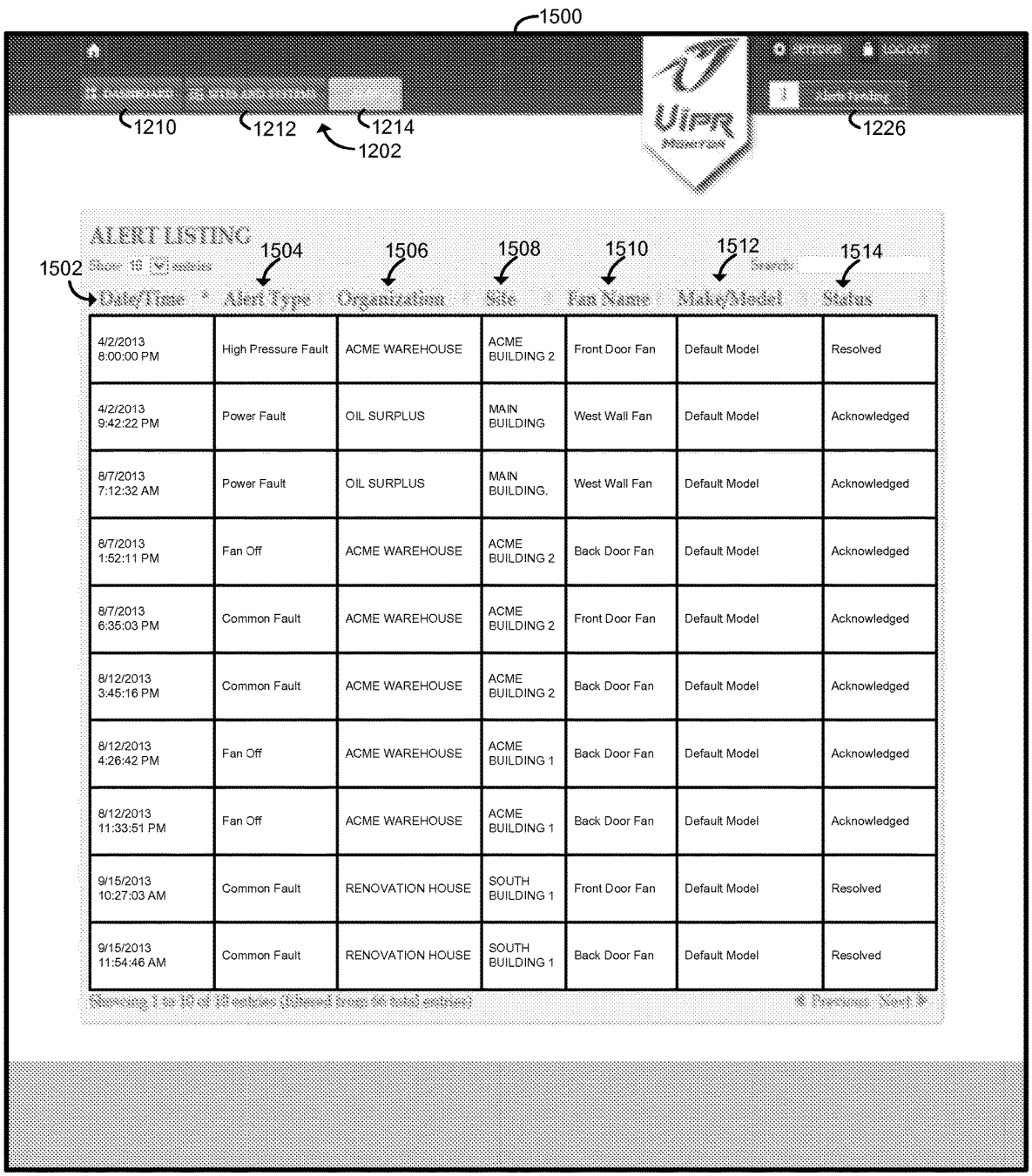
Figure 17:
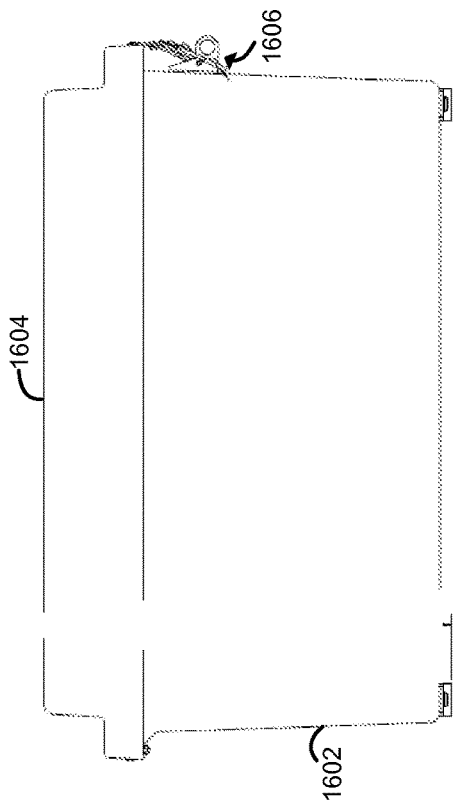
FIGS. 16 and 17 are simplified illustrations of at least one embodiment of a housing of the sensor controller of FIG. 3.
Figure 19:
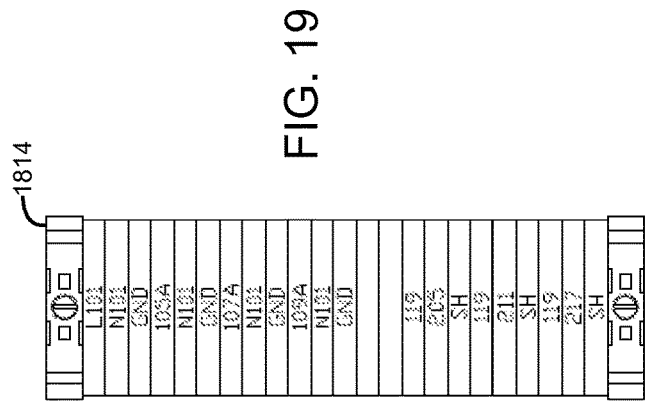
FIGS. 18 and 19 are simplified illustrations of controller circuitry of the sensor controller of FIGS. 16 and 17.
Figure 16:
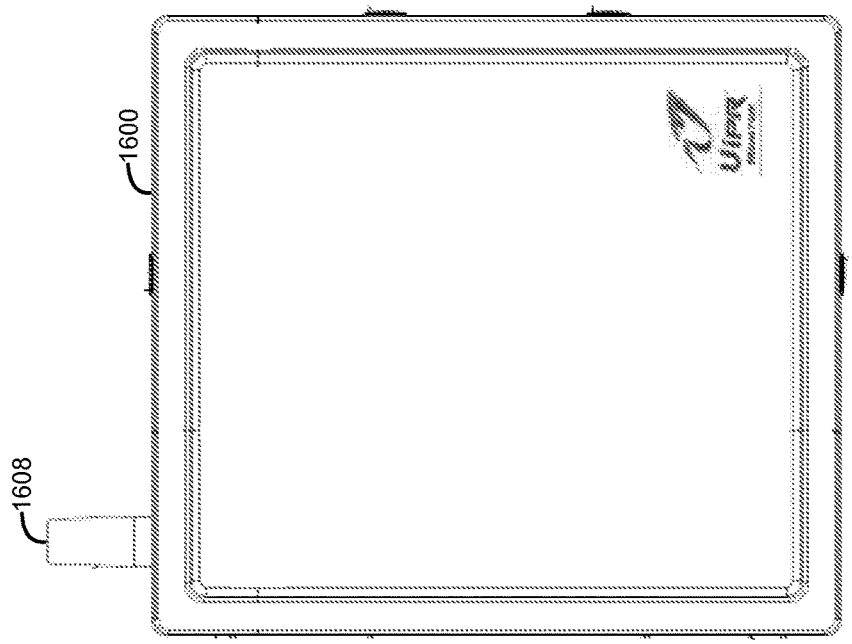

In block 1120, the operation monitor data server 108 monitors for selection of the sites button 1212 of the dashboard control panel 1202. If a user selects the sites button 1212, the method 1100 advances to block 1134 in which the operation monitor data server 108 displays organization and site information to the user of the remote computing device 114. The organization and site information may be embodied as any type of information related to monitored sites and/or the organizations to which the monitored sites belong. For example, an illustrative organization dashboard 1400 is shown in FIG. 14. The organization dashboard 1400 includes a list of organizations 1402, each having one or more monitored location sites. A user may select one of the organizations 1402 to see a list 1404 of the individual monitored sites. For example, the organization "ACME Warehouse" has seven monitored sites ("ACME Warehouse Building 1," "ACME Warehouse Building 2," etc.). A user may select one of the listed monitored sites to view additional information regarding the selected monitored site such as any alert details as discussed above in regard to FIG. 13. After the organization and site information has been displayed to the user in block 1134, the method 1100 advances to block 1132 in which the operation monitor data server 108 determines whether the user has selected to view the information dashboard 1200 as discussed above.

Referring back to block 1122, the operation monitor data server 108 monitors for selection of the alert button 1214 of the dashboard control panel 1202. If a user selects the alert button 1214, the method 1100 advances to block 1136 in which the operation monitor data server 108 displays historical alert data to user of the remote computing device 114. The historical alert data may be embodied as any type of data related to the generation of alerts are any one of the monitored sites. For example, the operation monitor data server 108 may display the time of the alerts in block 1130, the type of alerts in block 1140, the location of the alerts 1142, the identity of the fan having the alert in block 1144, and the current status of the alert in block 1146. An illustrative alert dashboard 1500 is shown in FIG. 5. The alert dashboard 1500 includes a date/time column 1502 in which the time and date of each listed alert is identified, an alert type column 1504 in which the type of alert is identified, an organization column 1506 in which the organization to which the monitored site generating the alert is identified, a site column 1508 identifying the monitored site generating the alert, a fan name column 1510 in which the fan causing or having the generated alert is identified, a make/model column 1512 identifying the type or module of the fan and/or corresponding sensor module(s) 104, and a status column 1514 identifying the current status of the alert (e.g., "acknowledged," "resolved," or "active"). Of course, other information may be included in the alert dashboard 1500 in other embodiments.

Referring back to FIG. 11, after the historical alert data has been displayed to the user of the remote computing device 114, the method 1100 advances to block 1132. As discussed above, the operation monitor data server 108 determines whether the user has selected to view the information dashboard 1200 in block 1132. If so, the method 1100 loops back to block 1110 in which the operation monitor data server 108 displays the information dashboard 1200 to the user of the remote computing device 114. If not, the method 1100 loops back to blocks 1118, 1120, and 1122 to monitor for other selections as discussed below.

Referring now to FIGS. 16-22, one illustrative embodiment of a sensor controller 106 is shown. The illustrative sensor controller 106 includes a housing 1600 having a bottom housing 1602 and a top housing 1604, which may be securing joined to each other via a clamp 1606. The housing 1600 houses the electrical components of the sensor controller 106 and provides an amount of environmental protection for those components. To facilitate communications to and from the sensor controller 106, a communications antenna 1608 (e.g., a cellular antenna) may extend from the housing 1600 to improve communications. The housing 1600 may be formed from any suitable material depending on, for example, the particular environment in which the sensor controller 106 will be deployed.

Figure 18:
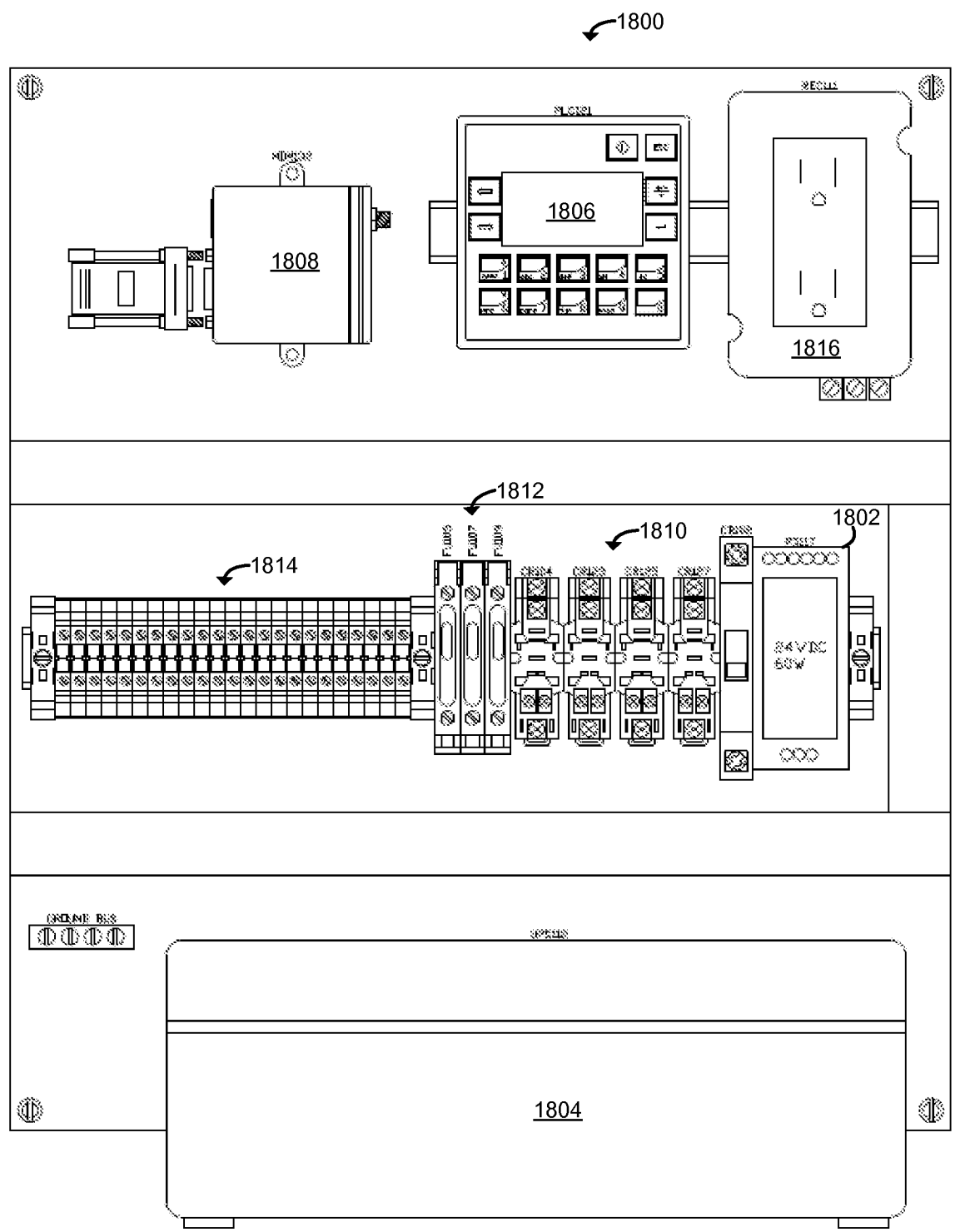

As shown in FIG. 18, the illustrative sensor controller 106 includes controller circuitry 1800 housed in the housing 1602. The illustrative controller circuitry 1800 includes a power supply 1802, an uninterruptible power supply 1804, a programmable logic controller 1806, and a communication circuit 1808. The programmable logic controller 1806 may be embodied as any type of programmable logic controller and illustratively includes an integrated human-machine interface (e.g., a built-in display, control panel, keyboard, touch screen, and/or any other type of human-machine interface for displaying data or controlling the PLC). For example, in some embodiments, the programmable logic controller 1806 may be embodied as the Vision120™ PLC (Part No. V120-22-R1), which is commercially available from Unitronics, Ltd. of Israel.

As discussed, in some embodiments, the sensor controller 106 may communicate with one or more of the operation monitor data servers 108, the remote mobile communication device 112, and/or the remote computer 114 via the network 110 using cellular communications. In such embodiments, the communication circuit 1808 may be embodied as, or otherwise include, a cellular modem. For example, in the illustrative embodiment, the communication circuit 1806 is embodied as a cellular modem included with the GPRS/GSM kit (Part No. GSM-KIT-41-J), which is commercially available from Unitronics Ltd. of Israel.

Additionally, in some embodiments as discussed above, the sensor controller 106 may communicate with one or more sensor modules 104 via wireless communications. In such embodiments, the controller circuitry 1800 (e.g., the communication circuit 1808 or, the programmable logic controller 1806) may include a wireless communication circuitry. For example, in one illustrative embodiment, such wireless communication circuitry is embodied wireless communication circuitry configured with frequency-hopping spread spectrum communication functionality such as the DX80DR9M-H MultiHop 900 Mhz Radio (Part No. 11431) and/or the DX80DR9M-HB1 MultiHop 900 Mhz Radio Board (Part No. 17420), which are commercially available from Banner Engineering Corp. of Minneapolis, Minn.

The illustrative controller circuitry 1800 of FIG. 18 also includes a relay bank 1810, a fuse bank 1812, an interconnection strip 1814 (see FIG. 19) to facilitate the interconnections of the controller circuitry 1800, and a power receptacle 1816 to distribute power from the uninterruptible power supply 1804 as discussed below. The number and type of individual relays and fuses included in the relay bank 1810 and the fuse bank 1812 may depend on the individual components of the controller circuitry 1800 and its interconnections. Similarly, the size and layout of the interconnection strip 1814 may depend on the individual components and interconnections of the controller circuitry 1800.

Figure 20:
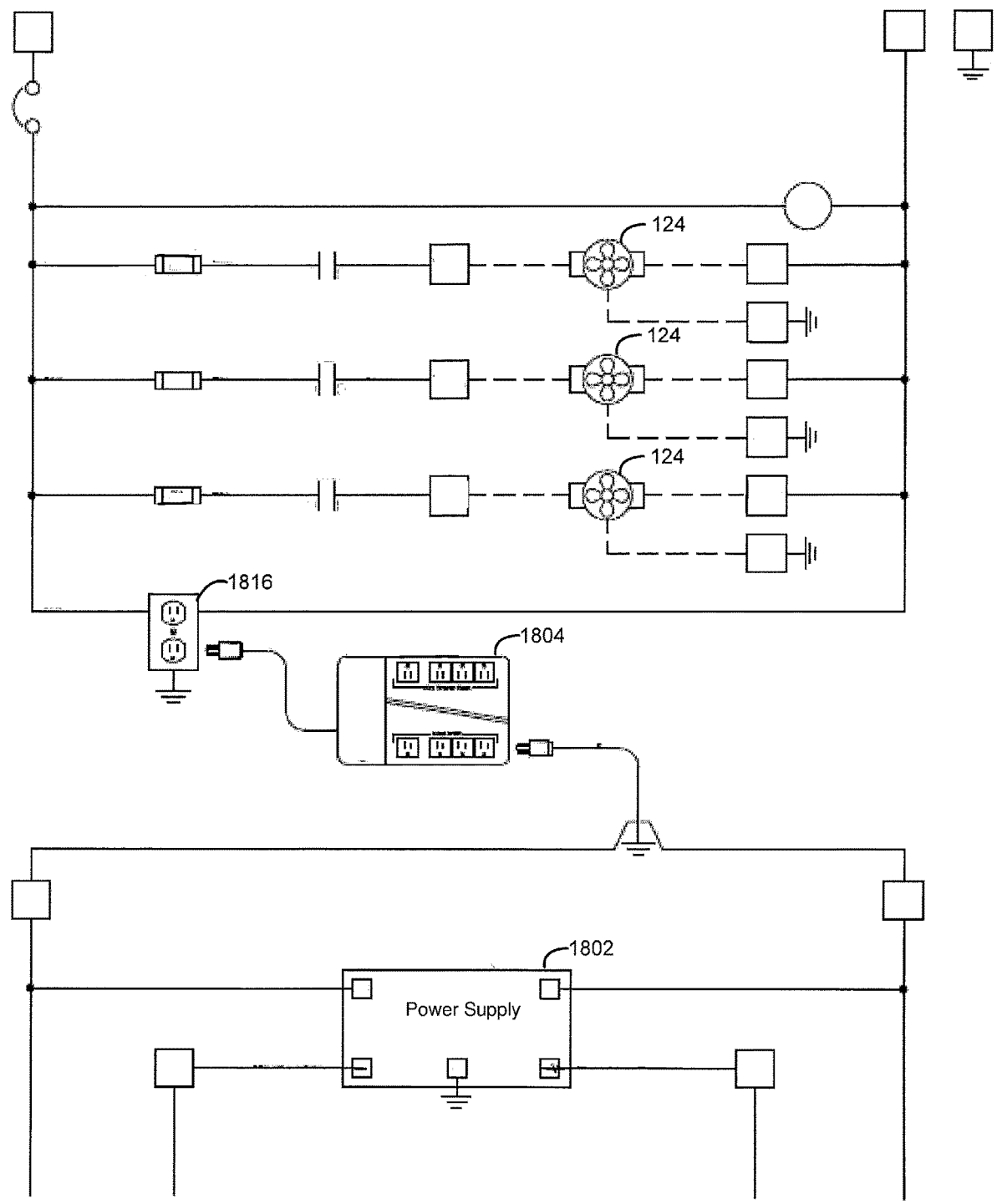
FIGS. 20-22 are simplified circuit diagrams of the controller circuitry of FIGS. 18 and 19.

Referring now to FIG. 20, one illustrative embodiment of the power connections of the controller circuitry 1800 is shown. In the illustrative controller circuitry 1800, the power supply 1802 and the uninterruptable power supply 1804 each receive input power from standard power lines. The power supply 1802 is configured to generate a 24 volt Direct Current (DC) output, which the uninterruptable power supply 1804 generates a 120 volt Alternating Current (AC) output. The output of the power supply 1802 is provided various components of the air contaminant mitigation system 102, such the sensor module 104. The output of the uninterruptable power supply 1804 supplies other components of the controller circuitry 1800 such as the programmable logic controller 1806 and the communication circuit 1808, as well as the exhaust fan(s) 124 in some embodiments.

Figure 21:
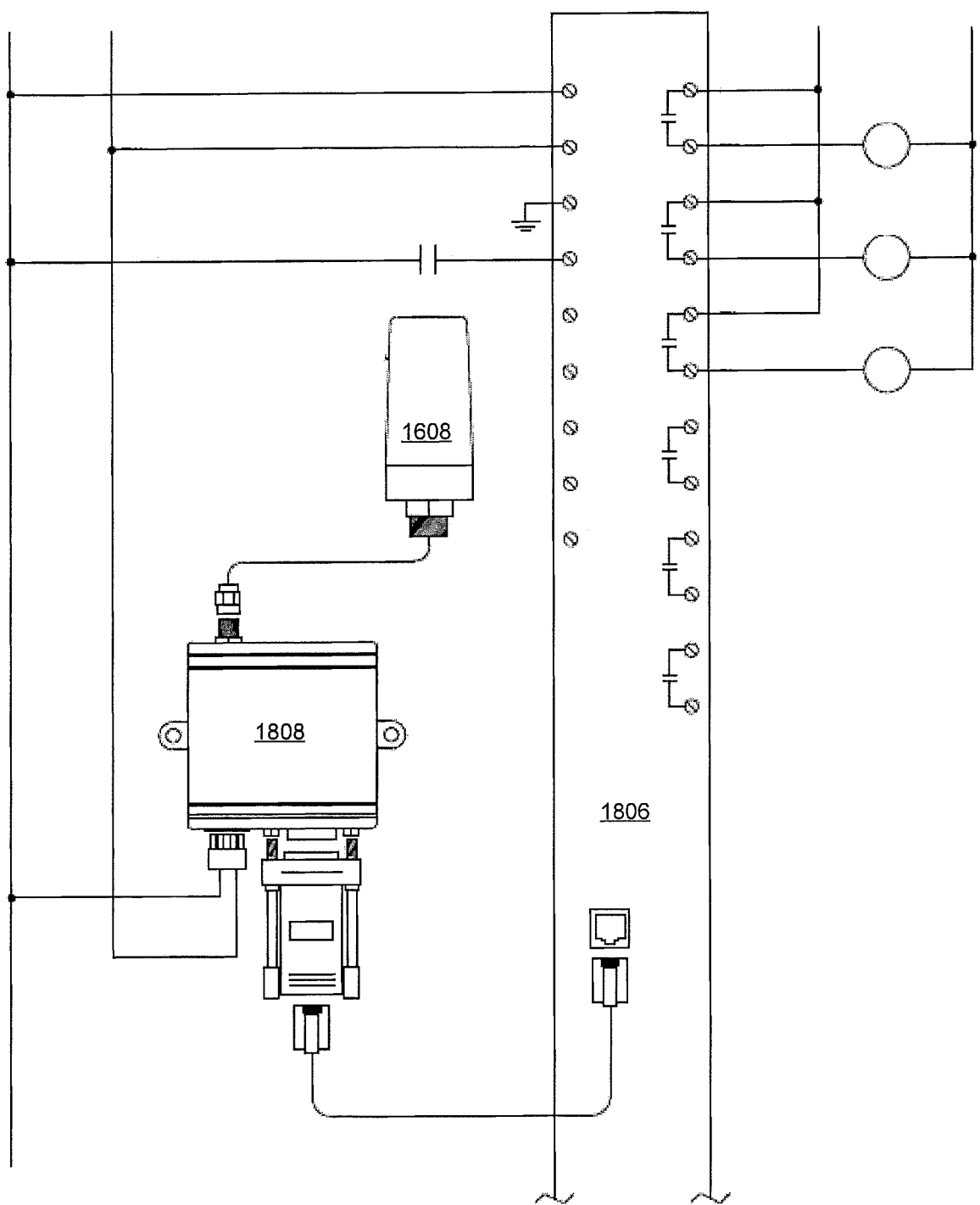
Figure 22:
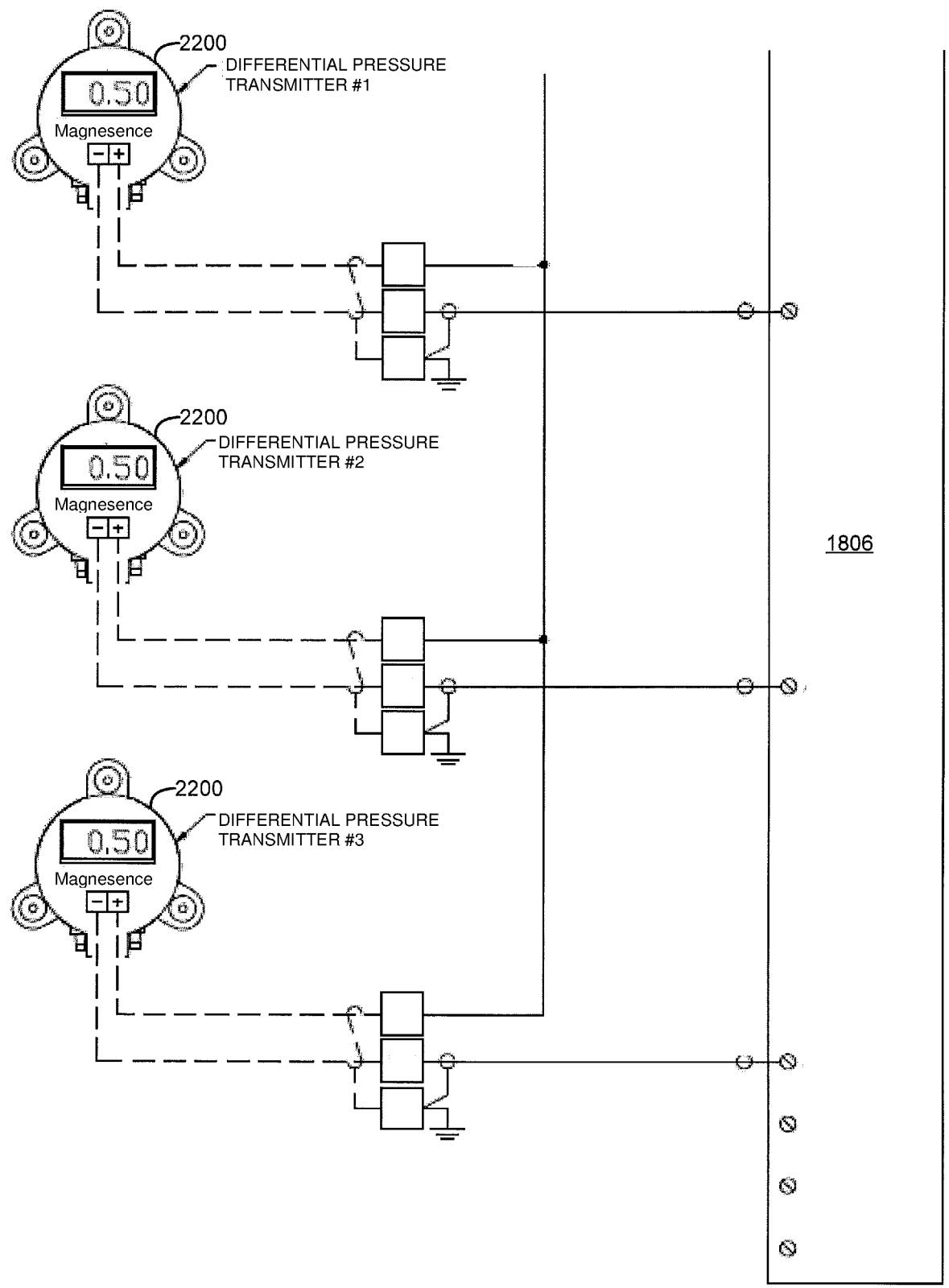

As shown in FIGS. 21 and 22, the programmable logic controller 1806 is communicatively coupled to the communication circuit 1806. Additionally, the programmable logic controller 1806 is communicatively coupled to the sensors 200 of the sensor module 104, which are illustratively embodied as differential pressure sensors 2200 having built in transmitters to transmit the sensor data to the programmable logic controller 1806. In the illustrative embodiment, the programmable logic controller 1806 is communicatively coupled to the sensors 2200 via wired interconnects but, as discussed above, the programmable logic controller 1806 and the sensors 2200 may use wireless communication in other embodiments to transfer sensor data from the individual sensor modules 104 to the programmable logic controller 1806 (i.e., to the controller circuitry 1800 of the sensor controller 106

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A system for monitoring an environmental contaminant mitigation and/or remediation system, the system comprising:
- a sensor module in communication with the environmental contaminant mitigation and/or remediation system and configured to (i) generate sensor signals indicative of a sensor condition of the environmental contaminant mitigation and/or remediation system and (ii) transmit the sensor signals; and
- a sensor controller including a housing and communicatively coupled to the sensor module, the sensor controller configured to (i) receive the sensor signals from the sensor module, and (ii) generate sensor data indicative of the sensor condition based on the sensor signals,
- wherein the environmental contaminant mitigation and/or remediation system includes an exhaust fan, and wherein the sensor module is configured to determine an operational state of the exhaust fan and is configured to generate sensor signals indicative of a loss of power supplied to the exhaust fan.

2. The system of claim 1, wherein the sensor controller is configured to generate an alarm in response to the sensor data having a reference relationship to a threshold value.

3. The system of claim 1, wherein the environmental contaminant mitigation system includes an air conduit extending from a sub-foundation area of a building to an external environment of the building.

4. The system of claim 3, wherein the sensor module comprises a pressure sensor configured to generate sensor signals indicative of an air pressure within the air conduit.

5. The system of claim 1, wherein generating sensor signals comprises generating pressure signals indicative of the pressure generated in a sub-foundation area of a building relative to the air pressure of an internal and/or external environment of a building.

6. The system of claim 1, wherein the sensor module comprises a gas sensor configured to detect the presence and/or magnitude of a type of gas.

7. The system of claim 1, wherein the sensor module comprises:
- at least one sensor configured to generate sensor signals indicative of a sensor condition of the environmental contaminant mitigation and/or remediation system; and
- a communication circuit to transmit the sensor signals to the sensor controller.

8. The system of claim 1, wherein the sensor controller comprises:
- a communication circuit to receive the sensor signals from the sensor module; and
- a control circuit to (i) generate the sensor data, (ii) compare the sensor data to a threshold value, and (iii) generate an alarm in response to the sensor data having a reference relationship to the threshold value.

9. The system of claim 8, wherein the communication circuit comprises:
- a communication circuit communicatively coupled to the sensor module and configured to receive the sensor signals from the sensor module; and
- the communication circuit to transmit the sensor data to a remote computer.

10. The system of claim 8, wherein the sensor controller further comprises a local alarm, and wherein the control circuit is configured to activate the local alarm in response to the sensor data having a reference relationship to the threshold value.

11. The system of claim 1, wherein the sensor controller is configured to change a setting, configuration, or operating condition of the environmental contaminant mitigation and/or remediation system based on the generated sensor data.

12. The system of claim 11, wherein changing a setting, configuration, or operating condition of the environmental contaminant mitigation system comprises adjusting pressure inside an air conduit, adjusting a speed of an exhaust fan, turning on or off an exhaust fan, adjusting a pressure differential or a pressure set point, and/or adjusting or setting reference alarm thresholds.

13. The system of claim 1, further comprising a data server, wherein the sensor controller is configured to transmit the sensor data to the data server, and the data server is configured to generate operation data indicative of the operation of the environmental contaminant mitigation and/or remediation system based the sensor data and facilitate access to the operation data by a remote computer.

14. The system of claim 13, wherein the data server is configured to determine an alarm condition based on the operation data and generate a user interface, viewable via the remote computer, having an indicator of the alarm condition to notify a user of the remote computer of the alarm condition.

15. The system of claim 13, wherein the data server is configured to generate, based on the operation data, an operational indicator indicative of the length of time for which the environmental contaminant mitigation system has been operational.

16. The system of claim 13, wherein the data server is configured to generate, based on the operation data, an operational indicator indicative of the presence and/or magnitude of a type of gas measured by a gas sensor of the environmental contaminant mitigation and/or remediation system.

17. The system of claim 1, wherein the sensor controller comprises:
- a communication circuit communicatively coupled to the sensor module and configured to receive the sensor signals from the sensor module; and
- the communication circuit to transmit the sensor data to a remote computer over a cellular network.

18. A system for monitoring an environmental contaminant mitigation and/or remediation system, the system comprising:
- a sensor module in communication with the environmental contaminant mitigation and/or remediation system and configured to (i) generate sensor signals indicative of a sensor condition of the environmental contaminant mitigation and/or remediation system and (ii) transmit the sensor signals; and
- a sensor controller including a housing and communicatively coupled to the sensor module, the sensor controller including (i) a communication circuit communicatively coupled to the sensor module and configured to receive the sensor signals from the sensor module; and (ii) a communication circuit to transmit the sensor data to a remote computer over a cellular network;
- wherein the sensor controller is configured to detect a loss of power to the sensor controller and send a signal to the remote computer indicative of the loss of power.

* * * * *